(12) United States Patent
Haener et al.

(10) Patent No.: US 11,755,682 B2
(45) Date of Patent: Sep. 12, 2023

(54) EVALUATING QUANTUM COMPUTING CIRCUITS IN VIEW OF THE RESOURCE COSTS OF A QUANTUM ALGORITHM

(71) Applicant: Microsoft Technology Licensing, LLC, Redmond, WA (US)

(72) Inventors: Thomas Haener, Zurich (CH); Martin H. Roetteler, Woodinville, WA (US); Krysta M. Svore, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1476 days.

(21) Appl. No.: 16/022,914

(22) Filed: Jun. 29, 2018

(65) Prior Publication Data
US 2019/0361675 A1 Nov. 28, 2019

Related U.S. Application Data

(60) Provisional application No. 62/676,539, filed on May 25, 2018.

(51) Int. Cl.
*G06F 17/11* (2006.01)
*G06N 10/00* (2022.01)
*G06N 10/60* (2022.01)

(52) U.S. Cl.
CPC ............ *G06F 17/11* (2013.01); *G06N 10/00* (2019.01); *G06N 10/60* (2022.01)

(58) Field of Classification Search
CPC .......... G06F 17/11; G06F 7/544; G06F 7/548; G06F 7/552; G06F 7/556; G06F 2207/5523; G06N 10/20; G06N 10/80
See application file for complete search history.

(56) References Cited

U.S. PATENT DOCUMENTS

2017/0194930 A1* 7/2017 Wiebe .................... B82Y 10/00

OTHER PUBLICATIONS

Bhaskar, et al., "Quantum Algorithms and Circuits for Scientific Computing", in Journal of Quantum Information & Computation, vol. 16, Issue 3, Nov. 30, 2015, 43 Pages.
Haner, et al., "Optimizing Quantum Circuits for Arithmetic", in Repository of arXiv:1805.12445, May 31, 2018, 12 Pages.
Munoz-Coreas, et al., "T-count and Qubit Optimized Quantum Circuit Design of the Non-Restoring Square Root Algorithm", in ACM Journal on Emerging Technologies in Computing Systems, vol. 14, Issue 3, Oct. 23, 2018, 19 Pages.
"International Search Report and Written Opinion Issued in PCT Application No. PCT/US2019/031941", dated Sep. 25, 2019, 16 Pages.

(Continued)

*Primary Examiner* — Matthew D Sandifer
(74) *Attorney, Agent, or Firm* — Ranjeev Singh; Singh Law, PLLC

(57) ABSTRACT

Methods for evaluating quantum computing circuits in view of the resource costs of a quantum algorithm are described. A processor-implemented method for performing an evaluation of a polynomial corresponding to an input is provided. The method includes determining a polynomial interpolation for a set of sub-intervals corresponding to the input. The method further includes constructing a quantum circuit for performing, in parallel, polynomial evaluation corresponding to each of the set of sub-intervals.

20 Claims, 12 Drawing Sheets

(56) References Cited

OTHER PUBLICATIONS

Romm, et al., "The Computer Method of Variable Piecewise Polynomial Approximation of Functions and Solutions of Ordinary Differential Equations", in Journal of Cybernetics and Systems Analysis, vol. 49, Issue 3, May 1, 2013, pp. 409-423.
Ylostalo, Jyri, "Function Approximation Using Polynomials", in Proceedings of the IEEE Signal Processing Magazine, vol. 23, Issue 5, Oct. 9, 2006, pp. 99-102.
"Cephes Mathematical Library", Retrieved from https://web.archive.org/web/20180318171211/http://www.moshier.net/, Mar. 18, 2018, 9 Pages.
Babbush, et al., "Exponentially more precise quantum simulation of fermions in second quantization", in Journal of Physics, vol. 18, Issue 3, Mar. 24, 2016, 18 Pages.
Barenco, et al., "Elementary gates for quantum computation", in Journal of Physical Review A, vol. 52, Issue 5, Nov. 1, 1995, pp. 1-31.
Bennett, Charles H., "Time space trade-offs for reversible computation", in Journal of SIAM Journal on Computing, vol. 18, Issue 4, Aug. 1989, pp. 766-776.
Bradshaw, Travis, "Quake-III-Arena", Retrieved from https://github.com/id-Software/Quake-III-Arena/blob/master/code/game/q_math.c, Feb. 1, 2012, 18 Pages.
Chan, Siu Man., "Pebble games and complexity", in Proceedings of Electrical Engineering and Computer Science, vol. 9, No. 3, Jan. 1, 2013, pp. 1-68.
Chiang, et al., "Efficient circuits for quantum walks", in Journal of Quantum Information and Computation, vol. 10, Issue 5-6, May 2010, pp. 1-15.
Draper, Thomas G., "Addition on a quantum computer", Retrieved from https://arxiv.org/pdf/quant-ph/0008033, Aug. 7, 2000, pp. 1-8.
Green, et al., "Quipper: a scalable quantum programming language", in Proceedings of ACM SIGPLAN Conference on Programming Language Design and Implementation, vol. 48, Issue 6, Jun. 16, 2013, 10 Pages.
Haner, et al., "A software methodology for compiling quantum programs", in Journal of Computing Research Repository, Apr. 2016, pp. 1-15.
Haner, et al., "Factoring using 2n + 2 qubits with toffoli-based modular multiplication", in Computing Research Repository, Nov. 23, 2016, 12 Pages.
Haner, et al., "High performance emulation of quantum circuits", in Proceedings of the International Conference for High Performance Computing, Networking, Storage and Analysis, Nov. 13, 2016, 9 Pages.
Harrow, et al., "Quantum algorithm for linear systems of equations", in Journal of Physical Review Letter, vol. 103, No. 15, Oct. 7, 2009, pp. 1-15.
Javadiabhari, et al., "Scaffcc: a framework for compilation and analysis of quantum computing programs", in Proceedings of the 11th ACM Conference on Computing Frontiers, May 20, 2014, 10 Pages.
Knill, Emmanuel, "An analysis of Bennett's pebble game", in Journal of Computing Research Repository, Aug. 1995, pp. 1-15.
Knuth, Donald E., "Evaluation of polynomials by computer", in Journal of Communications of the ACM, vol. 5, Issue 12, Dec. 1, 1962, pp. 595-599.
Lomont, Chris, "Fast inverse square root", in Technical Report, Feb. 28, 2003, pp. 1-12.
Ozols, et al., "Quantum rejection sampling", in Journal ACM Transactions on Computation Theory (TOCT)—Special issue on innovations in theoretical computer science, vol. 5, Issue 3, Aug. 2013, 33 Pages.
Parent, et al., "Reversible circuit compilation with space constraints", in Journal of Computing Research Repository, Oct. 2015, pp. 1-32.
Poulin, et al., "Sampling from the thermal quantum Gibbs state and evaluating partition functions with a quantum computer", in Journal of Physical Review Letters, vol. 103, Issue 22, Nov. 24, 2009, pp. 1-7.
Reiher, et al., "Elucidating reaction mechanisms on quantum computers", Retrieved from https://arxiv.org/pdf/1605.03590, May 11, 2016, pp. 1-18.
Remez., Eugene Y., "Sur la determination des polynomes dapproximation de degre donnee", in Journal of Communications in Mathematical Sciences, vol. 10, Issue 4163, Sep. 13, 2016.
Scherer, et al., "Concrete resource analysis of the quantum linear-system algorithm used to compute the electromagnetic scattering cross section of a 2d target", in Journal of Quantum Information Processing, vol. 16 Issue 3, Jan. 25, 2017, 65 Pages.
Shor, Peter W., "Algorithms for quantum computation: Discrete logarithms and factoring", in Proceedings of 35th Annual Symposium on Foundations of Computer Science, Nov. 20, 1994, pp. 124-134.
Steiger, "ProjectQ: an open source software framework for quantum computing", Retrieved from https://arxiv.org/abs/1612.08091, Dec. 23, 2016, pp. 1-11.
Takahashi, et al., "A quantum circuit for shor's factoring algorithm using 2n+ 2 qubits", in Journal of Quantum Information & Computation, vol. 6, Issue 2, Mar. 1, 2006, pp. 1-16.
Takahashi, et al., "Quantum addition circuits and unbounded fan-out", Retrieved from http://citeseerx.ist.psu.edu/viewdoc/download?doi=10.1.1.765.7470&rep=rep1&type=pdf, Oct. 14, 2009, pp. 1-17.
Temme, et al., "Quantum Metropolis Sampling", in Journal of Nature, vol. 471, Issue 7336, Mar. 2011, pp. 1-32.
Wakerly, John F., "Digital Design", in Publication of Prentice-Hall, vol. 3, 2000, pp. 1-830.
Wecker, et al., "LIQUi A Software Design Architecture and Domain-Specific Language for Quantum Computing", Retrieved From https://arxiv.org/pdf/1402.4467, Feb. 18, 2014, 14 Pages.

* cited by examiner

EVALUATING QUANTUM COMPUTING CIRCUITS IN VIEW OF THE RESOURCE COSTS OF A QUANTUM ALGORITHM

CROSS-REFERENCE TO A RELATED APPLICATION

This application claims the benefit of U.S. Provisional Application No. 62/676,539, filed May 25, 2018, titled "EVALUATING QUANTUM COMPUTING CIRCUITS IN VIEW OF THE RESOURCE COSTS OF A QUANTUM ALGORITHM," the entire contents of which are hereby incorporated herein by reference.

BACKGROUND

Quantum computing may solve certain problems much faster than classical devices. Examples of such problems include Shor's algorithm, unstructured search problems, and simulation of quantum mechanical systems. The crossover point at which the choice of quantum algorithm versus classical algorithm changes is based on the implementation details of the functions being implemented by the quantum circuits corresponding to the quantum algorithm.

SUMMARY

In one example, the present disclosure relates to a processor-implemented method for performing an evaluation of a polynomial corresponding to an input. The method may include determining a polynomial interpolation for a set of sub-intervals corresponding to the input. The method may further include constructing a quantum circuit for performing, in parallel, polynomial evaluation corresponding to each of the set of sub-intervals.

In another example, the present disclosure relates to a processor-implemented method for performing an evaluation of a polynomial corresponding to an input. The method may include determining a polynomial interpolation of an initial degree d for an initial set of sub-intervals corresponding to an input. The method may further include determining whether a required target precision is achievable based on the initial degree d and the set of sub-intervals. The method may further include if the target precision is achievable, then constructing a quantum circuit for performing, in parallel, polynomial evaluation corresponding to each of the set of sub-intervals. The method may further include if the target precision is not achievable, then either incrementing the initial degree d or subdividing the initial set of subintervals into additional intervals until the target precision is achievable and then constructing the quantum circuit.

In yet another example, the present disclosure relates to a processor-implemented method for performing an evaluation of a polynomial corresponding to an input. The method may include for each interval of a set of sub-intervals corresponding to the input, determining whether to perform the evaluation of the polynomial in a first mode or a second mode. The method may further include, in the first mode, performing the evaluation of the polynomial by: determining a polynomial interpolation of at most degree d for a first subset of the set of sub-intervals corresponding to the input, and constructing a quantum circuit for performing polynomial evaluation corresponding to each of the first subset of the set of sub-intervals. The method may further include, in the second mode, performing the evaluation of the polynomial using Newton's method for a second subset of the set of sub-intervals corresponding to the input, wherein the second subset is different from the first subset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
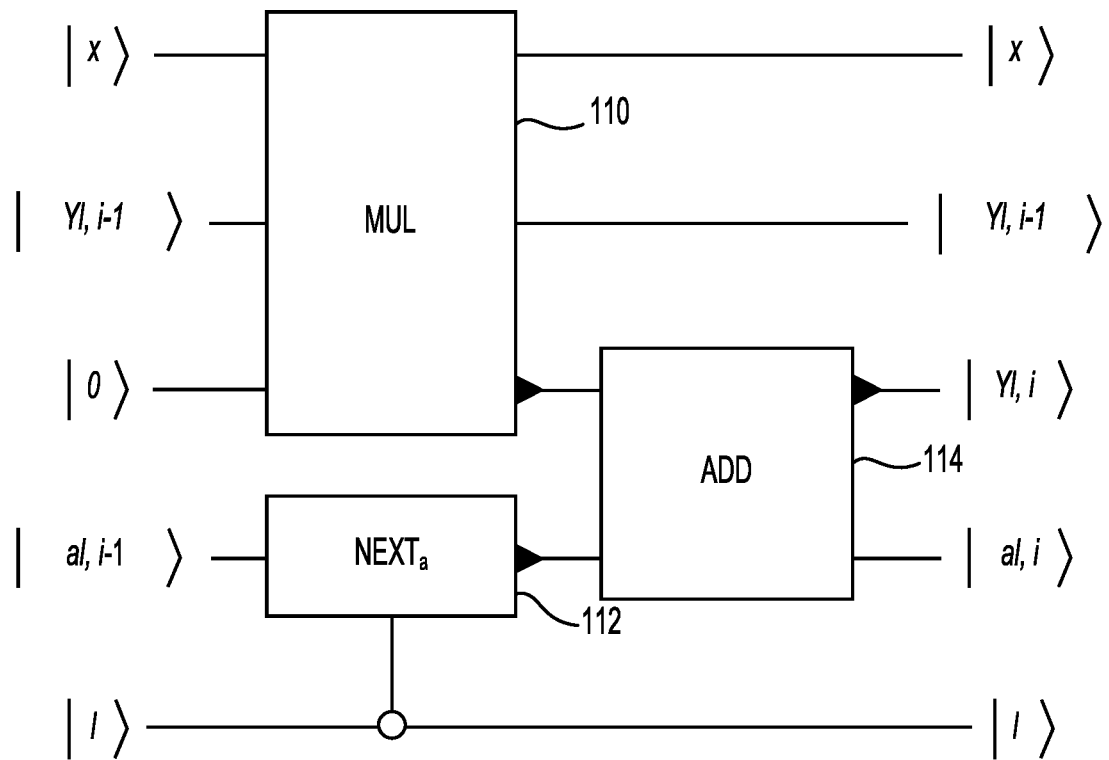
FIG. 1 shows a parallel polynomial evaluation circuit in accordance with one example.

Examples described in this disclosure relate to evaluating quantum computing circuits in view of the resource costs of a quantum algorithm. Certain examples relate to the problem of implementing numerical operations on a quantum computer. Such operations arise, for instance, in the implementation of classical functions on a superposition of inputs and are omnipresent in the quantum algorithm literature. One example case is the computation of amplitudes from a given subroutine specification. In this case, a need for computing arcsine functions or arcsine functions composed with a square root function arises. In order to facilitate implementation of numerical operations, their testing, and estimation of resource requirements, a quantum software module is implemented. This module allows one to automatically generate quantum circuits for evaluating piecewise smooth functions of inputs that are given in the computational basis. The present disclosure provides details of this module and provides resource estimates for some often-encountered classical functions such as Gaussians, tan h (hyperbolic tangent), and sine/cosine. In addition, the present disclosure describes implementations of inverse square root and arcsine, which may also be used in quantum chemistry and machine learning applications. The provided cost estimates might help to identify and address bottlenecks in future quantum applications. One technique relates to triaging inputs into subintervals, which are evaluated using a circuit for parallel polynomial evaluation.

Certain examples address the implementation of numerical functions such as 1/x, 1/sqrt(x), arcsin(x), sin(x), tan h(x), and in general the implementation of smooth functions via a piece-wise polynomial approximation, followed by functions that are used in specific applications. Some examples combine the evaluation scheme for smooth functions with the inverse square root, which is for instance, applicable to the case of implementation of arcsin(x). Having reversible implementations of these functions available enables more detailed cost analyses of various quantum algorithms such as the HHL algorithm for matrix inversion. Other use cases arise in Quantum Metropolis sampling, Gibbs state preparation and in the widely applicable framework of Quantum Rejection Sampling to transform one or more samples of a given quantum state into a quantum state with potentially different amplitudes, while maintaining relative phases.

Further applications of numerical functions can be anticipated in the quantum machine learning, e.g., threshold functions that need to be evaluated on a superposition of values, e.g., tan h(x) or sigmoid functions. In addition, $1/\sqrt{x}$ can be used, e.g., for (re-)normalization of intermediate results. In quantum algorithms for chemistry further examples for numerical functions arise, e.g., for on-the-fly computation of the one- and two-body integrals. There, $1/\sqrt{x}$ as well as the evaluation of smooth functions such as Gaussians is needed, and on-the-fly computation of finite element matrix elements often involves the evaluation of smooth functions such as sin(x) and cos(x).

A basic scheme to evaluate a single polynomial on a quantum computer in the computational basis is the classical Horner scheme, which evaluates:

$$P(x) = \sum_{i=0}^{d} a_i x^i$$

by iteratively performing a multiplication by x, followed by an addition of $a_i$ for $i \in \{d, d-1, \ldots, 0\}$. This may include performing the following operations:

$$a_d x + a_{d-1} \mapsto a_d x^2 + a_{d-1} x + a_{d-2}$$

$$\ldots$$

$$\mapsto a_d x^d + \ldots + a_0.$$

A reversible implementation of this scheme may simply store all intermediate results. At iteration i, the last iterate $y_{i-1}$ is multiplied by x into a new register $y_i$, followed by an addition by the constant $a_i$. Due to the linear dependence of successive iterates, a pebbling strategy can be employed in order to optimize the space/time trade-offs according to some chosen metric.

Oftentimes, the degree d of the minimax approximation over a domain $\Omega$ must be chosen to be very high in order to achieve a certain $L_\infty(\Omega)$-error. In such cases, it makes sense to partition $\Omega$, i.e., find $\Omega_i$ such that $$\Omega = \bigcup_{i=0}^{M} \Omega_i, \; \Omega_i \cap \Omega_j = \emptyset \, \forall \, i \neq j,$$

and to then perform a case distinction for each input, evaluating a different polynomial for $x \in \Omega_i$ than for $y \in \Omega_j$ if $i \neq j$. A straight-forward generalization of this approach to the realm of quantum computing would loop over all subdomains $\Omega_i$ and, conditioned on a case-distinction or label register l, evaluate the corresponding polynomial. Thus, the cost of this inefficient approach grows linearly with the number of subdomains.

In order to improve upon this approach, one can parallelize the polynomial evaluation if the degree d is constant over the entire domain $\Omega$. FIG. 1 shows a parallel polynomial evaluation circuit 100 in accordance with one example. $NEXT_a$ 112 changes the register to hold the next set of coefficients (in superposition) $\Sigma_l |1\rangle |a_{l,i-1}\rangle \mapsto \Sigma_l |1\rangle |a_{l,i}\rangle$. 110 and ADD 114 perform a multiplication and an addition, respectively. The small triangle indicates the output of the ADD 114 and MUL 110 gates. In this example, merely adding the label register l mentioned above and performing:

$$|y_{l,i-1} x\rangle |0\rangle |l\rangle \mapsto |y_{l,i-1} x\rangle |a_{l,i}\rangle |l\rangle \qquad (1)$$

$$\mapsto |y_{l,i-1} x + a_{l,i}\rangle |a_{l,i}\rangle |l\rangle \qquad (2)$$

$$\mapsto |y_{l,i}\rangle |0\rangle |l\rangle \qquad (3)$$

enables the evaluation of multiple polynomials in parallel. The impact on the circuit size is minor. This is because, in this example, the depth of the circuit remains unaltered, since the initialization step (1) can be performed while multiplying the previous iterate by $y_{i-1}$ by x; see FIG. 1. An illustration of the circuit for computing the label register l can be found in FIG. 2. The LABEL gate 210 (additional details in 220) initializes the label register $|l\rangle$, which consists of $\lfloor \log_2(M) \rfloor$ qubits, to indicate the subdomain $\Omega_l$ to which x belongs. $P_i$ (e.g., $P_1$ 230, $P_2$ 232, and $P_M$ 234) computes the predicate indicating whether $x \in \Omega_i$ into the ancilla qubit. Conditioned on this result, the label is then initialized to the value chosen to represent the i-th interval. The purpose of the SET blocks 222, 224, 226 is to create in the label register a particular bit-pattern that corresponds to the specific label that identifies the subdomain $\Omega_l$ to which x belongs. To this end, the SET blocks 222, 224, 226 consist of bit-flip operations that flip the bits of the bit-pattern corresponding to the subdomain $\Omega_l$ when starting from the all-zero-bit pattern. A slight drawback of this parallel evaluation is that it requires one extra ancilla register for the last iteration, since the in-place addition circuit can no longer be used. The small overhead of using many intervals results in good approximations already for low-degree polynomials (and thus using few qubit registers).

Using reversible pebble games, it is possible to trade the number of registers needed to store the iterates with the depth of the resulting circuit. The parameters are: the number n of bits per register, the total number m of these n-qubit registers, the number r of Horner iterations, and the depth d of the resulting circuit. The trade-space we consider involves m, r, and d. In particular, the optimal circuit depth for a fixed number m of registers and a fixed number r of iterations is determined. In one example, dynamic programming is used to construct the optimal strategies as the dependency graph is just a line which is due to the sequential nature of Homer's method. The optimal number of pebbling steps as a function of m and r can be found in Table 1 below.

TABLE 1

| m\r | 1 | 2 | 3 | 4 | 5 | 6 | 7 | 8 | 16 | 32 | 64 |
|---|---|---|---|---|---|---|---|---|---|---|---|
| 1 | 1 | ∞ | ∞ | ∞ | ∞ | ∞ | ∞ | ∞ | ∞ | ∞ | ∞ |
| 2 | 1 | 3 | ∞ | ∞ | ∞ | ∞ | ∞ | ∞ | ∞ | ∞ | ∞ |
| 3 | 1 | 3 | 5 | 9 | ∞ | ∞ | ∞ | ∞ | ∞ | ∞ | ∞ |
| 4 | 1 | 3 | 5 | 7 | 11 | 15 | 19 | 25 | ∞ | ∞ | ∞ |
| 5 | 1 | 3 | 5 | 7 | 9 | 13 | 17 | 21 | 71 | ∞ | ∞ |
| 6 | 1 | 3 | 5 | 7 | 9 | 11 | 15 | 19 | 51 | 193 | ∞ |
| 7 | 1 | 3 | 5 | 7 | 9 | 11 | 13 | 17 | 49 | 145 | 531 |
| 8 | 1 | 3 | 5 | 7 | 9 | 11 | 13 | 15 | 47 | 117 | 369 |

In order to enable automatic compilation of a classical oracle used in a quantum algorithm, certain examples use the Remez algorithm as a preferred embodiment to obtain a piece-wise polynomial approximation, which can be implemented using a quantum circuit for parallel polynomial evaluation. This allows one to triage inputs into different sub-intervals and to apply the parallel polynomial evaluation for different polynomials, depending on the particular sub-interval the input x falls into. This method works for superposition of input x also.

Figure 3:
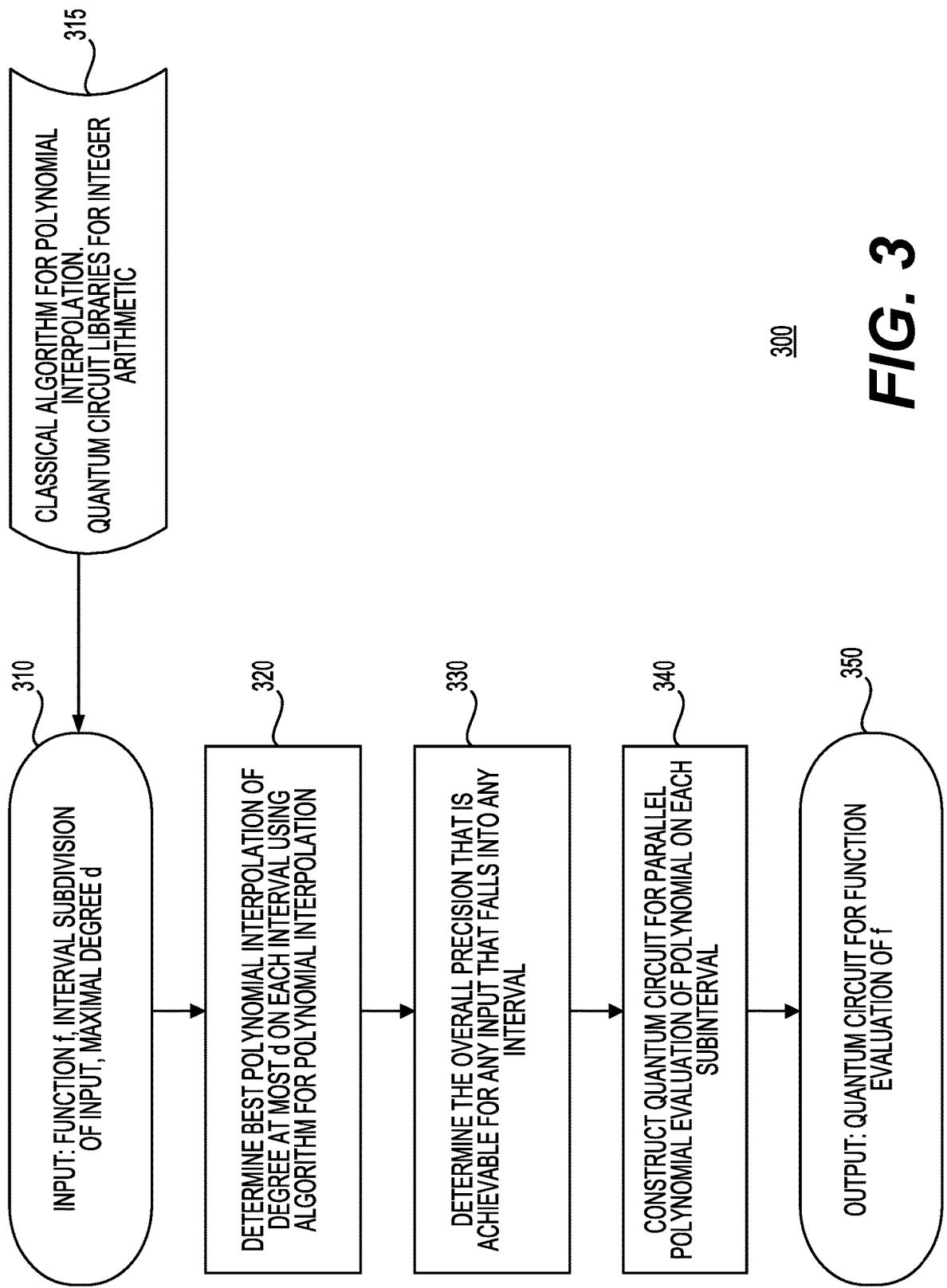
FIG. 3 shows a flow chart of a method for performing an evaluation of a polynomial corresponding to an input in accordance with one example.

FIG. 3 shows a flow chart for implementing an evaluation of a polynomial on a quantum computer with a given set of intervals and a given degree. Step 310 may include receiving an input, including a function f, an interval subdivision of input, and a maximal degree d. A system (e.g., quantum computing system 710 of FIG. 7) may include access to at least one classical algorithm for polynomial interpolation and quantum circuit libraries for integer arithmetic.

Step 320 may include determining the best polynomial of degree at most d on each interval using an algorithm for polynomial evaluation. In one example, the Remez algorithm may be used to determine a piecewise polynomial approximation. In order to enable automatic compilation of a classical oracle used in a quantum algorithm, the Remez algorithm can be used in a subroutine to determine a piece-wise polynomial approximation, which can then be implemented using the circuit described later.

In particular, the oracle may be implemented with a given precision, accuracy, and number of available quantum registers (or, equivalently, the polynomial degree d) over a user-specified interval $\Omega=[a, a+L)$. The example algorithm proceeds as follows: in a first step, run the Remez algorithm which, given a function $f(x)$ over a domain $\Omega \subset \mathbb{R}$ and a polynomial degree d, finds the polynomial P(x) which approximates $f(x)$ with minimal $L_\infty(\Omega)$-error, and check whether the achieved error is low enough. If it is too large, reduce the size of the domain $$\Omega_1 := \left[a, a+\frac{L}{2}\right)$$

and check again.

Repeating this procedure and carrying out binary search on the right interval border will eventually lead to the first subdomain $\Omega_1=[a, b_1)$ with the corresponding degree d polynomial achieving the desired accuracy on $\Omega_1$. Next, the next subdomain $\Omega_2=[b_1, b_2)$ is determined using the same procedure. This is iterated until $b_i \geq b$, meaning that all required subdomains and their corresponding polynomials have been determined and $f(x)$ can be implemented using a parallel polynomial evaluation circuit. This algorithm was implemented and then run for various functions, target accuracies, and polynomial degrees in order to determine approximate resource estimates for these parameters.

Figure 2:
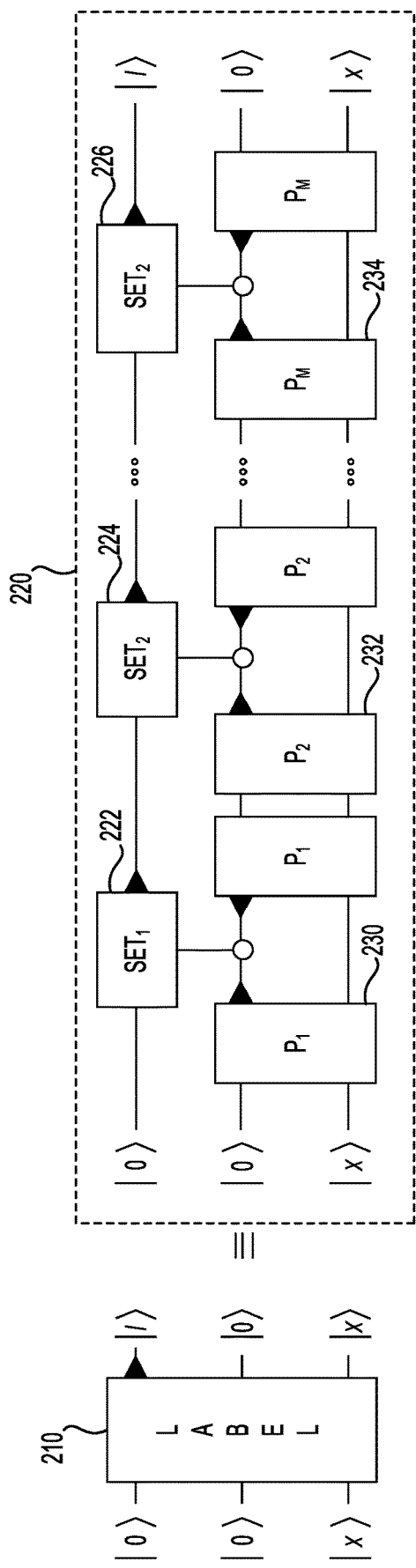
FIG. 2 shows a circuit for computing the label register l in accordance with one example.

In one example, the Remez algorithm may be implemented using the circuit in FIG. 1. As explained earlier, the circuit in FIG. 1 may perform parallel evaluation of a polynomial. The MUL box 110 and the ADD box 114 may perform a multiplication and an addition, respectively. The small black triangles in FIG. 1 indicate the output of the ADD and MUL gates, respectively. Referring still to FIG. 1, the $\text{NEXT}_a$ block 112 changes the register to hold the next set of coefficients (in superposition). FIG. 2 may be used to label the coefficients to indicate the subdomains in which an input x belongs. In this example, the subdomain may be a superset of the intervals.

Table 2 below provides example code corresponding to a function to implement the Remez's algorithm to find a polynomial for a given interval. The code also includes a function to subdivide an interval into subintervals.

TABLE 2

```
import math
import numpy as np
from matplotlib import pyplot as plt
# returns n chebyshev nodes on the interval (a,b)
def getChebyshevNodes(n, a, b):
    nodes = [.5*(a+b) + .5*(b-a)*math.cos((2*k+1)/(2.*n)*math.pi) for k in range (n)]
    return nodes
# returns the error on given nodes of a polynomial with coefficients polycoeff
# approximating the function with function values exactvals (on these nodes).
def getErrors(exactvals, polycoeff, nodes):
    ys = np.polyval(polycoeff, nodes)
    for i in range(len(ys)):
        ys[i] = abs(ys[i]-exactvals[i])
    return ys
# returns the coefficients of a polynomial of degree d approximating the function fun over the interval (a,b)
# actually, cn2 should be chosen adaptively but for most functions this works just fine.
def RunRemez(fun, a, b, d = 5, odd_or_even=False, even = False, tol = 1.e-13):
    finished = False
    cn = getChebyshevNodes(d+2, a, b)
    cn2 = getChebyshevNodes(50*d, a, b)
    it = 0
    while not finished and len(cn)==d+2 and it < 50:
        it += 1
        b = np.array([fun(c) for c in cn])
        A = np.matrix(np.zeros([d+2,d+2]))
        for i in range(d+2):
            x = 1.
            if odd_or_even and not even:
                x *= cn[i]
            for j in range(d+2):
                A[i, j] = x
                x *= cn[i]
                if odd_or_even:
                    x *= cn[i]
            A[i, -1] = (-1)**(i+1)
        res = np.linalg.solve(A, b)
        revlist = list(reversed(res[0:-1]))
        sccoeff = [ ]
        for c in revlist:
            sccoeff.append(c)
            if odd_or_even:
                sccoeff.append(0)
        if even:
            sccoeff = sccoeff[0:-1]
```

TABLE 2-continued

```
        errs = getErrors([fun(c) for c in cn2], sccoeff, cn2)
        maximum_indices = [ ]
        if errs[0]>errs[1]:
            maximum_indices.append(0)
        for i in range(1,len(errs)-1):
            if errs[i]>errs[i-1] and errs[i]>errs[i+1]:
                maximum_indices.append(i)
        if errs[-1]>errs[-2]:
            maximum_indices.append(-1)
        finished = True
        for idx in maximum_indices[1:]:
            if abs(errs[idx]-errs[maximum_indices[0]]) > tol:
                finished = False
        cn = [cn2[i] for i in maximum_indices]
    return (max(abs(errs)),sccoeff)
# Partitions the interval [a,b] and approximates the function f
# using piecewise minimax polynomial approximation of degree d and
max. error eps
# The function roundIntervalBorder can modify the right border of the
interval
# e.g., round it to a specific #bits
def RunPartitioning(f, a, b, d, eps, roundIntervalBorder, Odd, Even):
    A = [roundIntervalBorder(a)]
    coeffs = [ ]
    numIntervals = 0
    while A[-1] < roundIntervalBorder(b)-1.e-14:
        a = A[numIntervals]
        deltaL = (roundIntervalBorder(b) - a)*.5
        L = roundIntervalBorder(b) - a
        while deltaL > 1.e-12:
            if roundIntervalBorder(a + L) - a < 1.e-14:
                raise RuntimeError("roundIntervalBorder rounded interval
length to zero! Please decrease epsilon or increase the resolution of the
interval borders.")
            err, coeff = RunRemez(f, a, roundIntervalBorder(a + L), d, Odd
or Even, Even, 1.e-14)
            if err > eps:
                L -= deltaL
            elif a+L < roundIntervalBorder(b):
                L += deltaL
            else:
                L = roundIntervalBorder(b)-a
            deltaL *= 0.5
        coeffs.append(coeff)
        A.append(roundIntervalBorder(a + L))
        numIntervals += 1
    return A[0:numIntervals+1], coeffs
# Function to plot the resulting partitioning
def PlotApproximation(f, A, coeffs):
    numSteps = 100
    nodes = [ ]
    approx_y = [ ]
    for i in range(len(A)-1):
        curvalues = [A[i](A[i+1]-A[i])*k/numSteps for k in
range(numSteps)]
        approx_y.extend(np.polyval(coeffs[i], curvalues))
        nodes.extend(curvalues)
    ys = [f(x) for x in nodes] # exact values
    yerrs = [abs(ys[i]-approx_y[i]) for i in range(len(ys))]
    plt.plot(nodes, yerrs)
    plt.yscale('log')
    plt.show( )
if _name_ == "_main_":
    ################################
    # Let's test the implementation:#
    ################################
    def f(x):
        return math.exp(-x)
    err = 1.e-7
    Odd = False
    Even = False
    a = 0.0
    b = -math.log(err) #math.pi/2
    A, coeffs = RunPartitioning(f, a, b, 5, err, lambda x: x, Odd, Even)
    print("Segments: { }".format(len(A)))
    for i in range(len(A)-1):
    print("{ },{ }):\t{ }".format(A[i], A[i+1], coeffs[i]))
    PlotApproximation(f, A, coeffs)
```

Step 330 may include determining the overall precision that is achievable for any input that falls into any interval.

Step 340 may include constructing a quantum circuit for parallel polynomial evaluation of polynomials on each subinterval. After all of the subdomains and the corresponding polynomials have been determined, f(x) may be implemented using the parallel polynomial evaluation circuit shown in FIG. 2.

Step 350 may include generating an output, including a quantum circuit for function evaluation of f.

Figure 4:
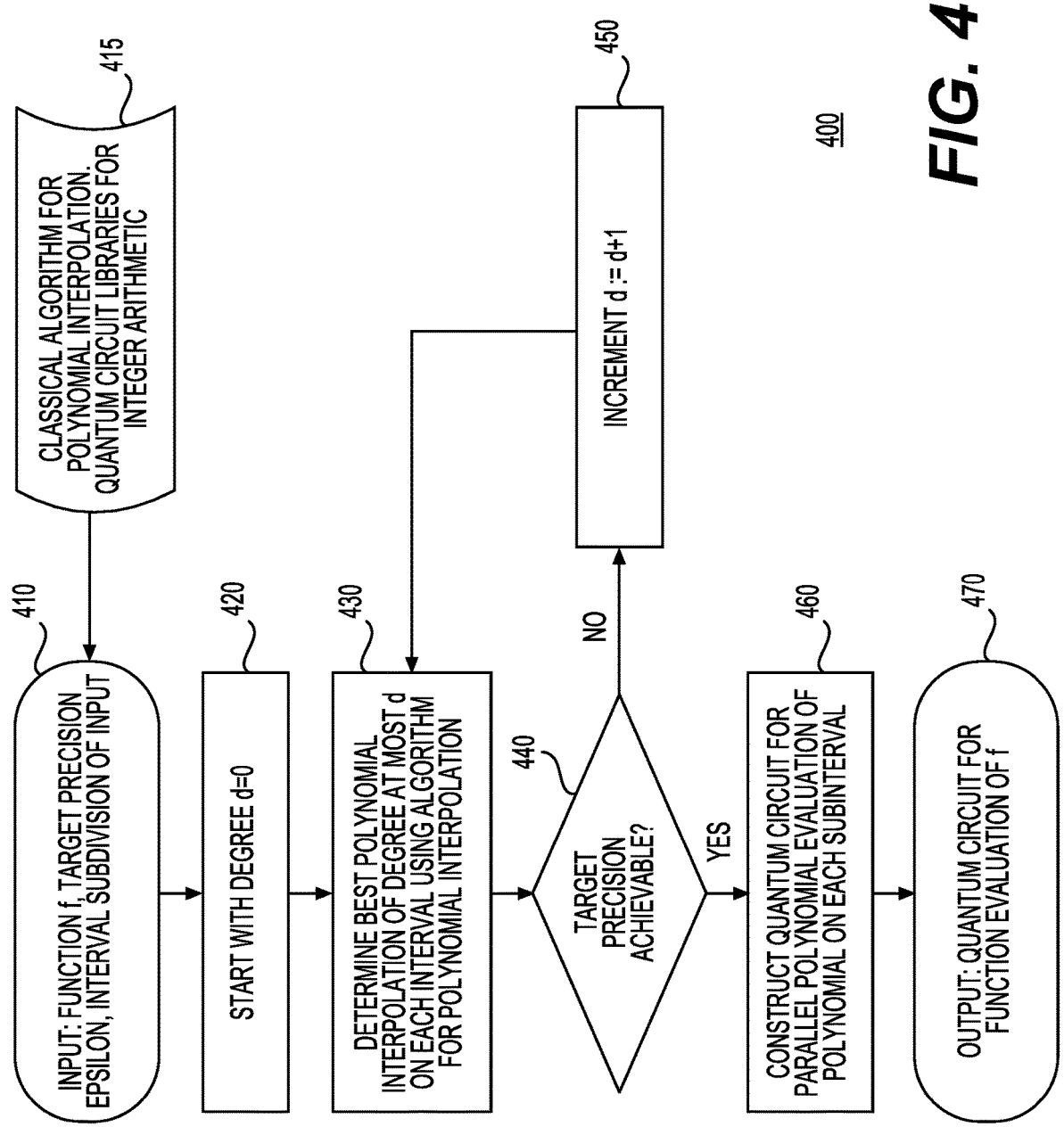
FIG. 4 shows a flow chart of another method for performing an evaluation of a polynomial corresponding to an input in accordance with one example.

FIG. 4 shows a flow chart for implementing an evaluation of a polynomial on a quantum computer with a target precision epsilon and an interval subdivision of the input. Thus, unlike the method described with respect to FIG. 3, in this method the maximal degree of precision is not specified a priori. Thus, as part of this example method, the degree of the polynomial is incremented by 1 each time until the target precision is achieved. Step 410 may include receiving an input, including a function f, a target precision epsilon, and an interval subdivision of input. A system (e.g., quantum computing system 710 of FIG. 7) may include access to at least one classical algorithm for polynomial interpolation and quantum circuit libraries for integer arithmetic. Step 420 may include starting with a degree d=0 of the polynomial.

Next, step 430 may include determining the best polynomial interpolation of degree at most d on each interval using an algorithm for polynomial evaluation. In one example, the Remez algorithm may be used to determine a piecewise polynomial. In one example, the Remez algorithm may be implemented using the circuit in FIG. 1.

Next, step 440 may include determining whether a target precision is achievable. If not, then the degree of the polynomial may be incremented by 1, as shown in step 450. If yes, then step 460 may include constructing a quantum circuit for polynomial evaluation of each polynomial on each subinterval. After all of the subdomains and the corresponding polynomials have been determined, f(x) may be implemented using the parallel polynomial evaluation circuit shown in FIG. 1.

Next, step 470 may include generating an output, including a quantum circuit for evaluation of the function f.

Figure 5:
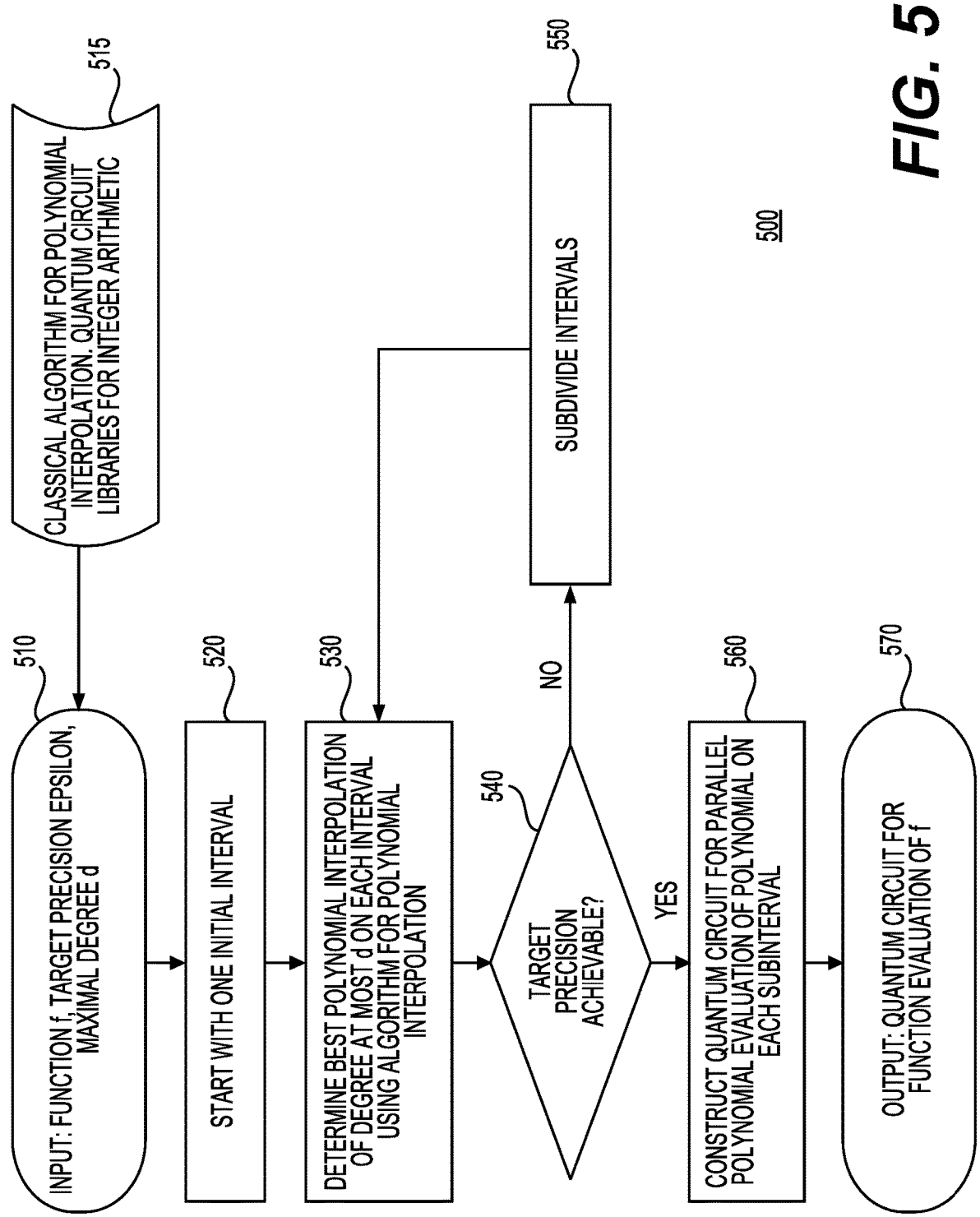
FIG. 5 shows a flow chart of another method for performing an evaluation of a polynomial corresponding to an input in accordance with one example.

FIG. 5 shows a flow chart for implementing an evaluation of a polynomial on a quantum computer with a target precision epsilon and a maximal degree d. Thus, unlike the method described with respect to FIG. 1, in this method the sub intervals are not known. Thus, as part of this example method, the intervals are subdivided until the target precision is achieved. Step 510 may include receiving an input, including a function f, a target precision epsilon, and an interval subdivision of input. A system (e.g., e.g., quantum computing system 710 of FIG. 7) may include access to at least one classical algorithm for polynomial interpolation and quantum circuit libraries for integer arithmetic. Step 520 may include starting with a degree d=0 of the polynomial.

Next, step 530 may include determining the best polynomial interpolation of degree at most d on each interval using an algorithm for polynomial evaluation. In one example, the Remez algorithm may be used to determine a piecewise polynomial approximation. In one example, the Remez algorithm may be implemented using the circuit in FIG. 1. The circuit in FIG. 1 may perform parallel evaluation of a polynomial. As described earlier, the MUL box 110 and the ADD box 114 may perform a multiplication and an addition, respectively. The small black triangles in FIG. 1 indicate the output of the ADD and MUL gates, respectively. Referring still to FIG. 1, the NEXT$_a$ block 112 changes the register to hold the next set of coefficients (in superposition). As explained earlier, the circuit for labeling shown in FIG. 2 may be used to label the coefficients to indicate the subdomains in which an input x belongs. In this example, the subdomain may be a superset of the intervals.

Next, step 540 may include determining whether a target precision is achievable. If not, then the intervals may be further subdivided, as shown in step 550. Table 3 below provides an example of code for interval partitioning functions, such as sin(x), arcsin(x), tan h(x), exp(x) etc.

TABLE 3

```
import math
import numpy as np
from matplotlib import pyplot as plt
from IntervalPartitioner import *
    def run_gaussian(eps, deg):
        def f(x):
            return math.exp(-x*x)
        Odd = False
        Even = True
        a = 0
        b = 5
        A, coeffs = run_fun(f, a, b, deg, eps, Odd, Even)
        return len(A)
    def run_tanh(eps, deg):
        def f(x):
            return math.tanh(x)
        Odd = True
        Even = False
        a = 0
        if eps > 3.e-6:
            b = 7
        elif eps > 3.e-8:
            b = 9
        else:
            b = 10
        A, coeffs = run_fun(f, a, b, deg, eps, Odd, Even)
        return len(A)
    def run_sin(eps, deg):
        def f(x):
            return math.sin(x)
        Odd = True
        Even = False
        a = 0
        b = math.pi/2.
        A, coeffs = run_fun(f, a, b, deg, eps, Odd, Even)
        return len(A)
    def run_fun(f, a, b, deg, eps, Odd, Even):
        A, coeffs = RunPartitioning(f, a, b, deg, eps, lambda x: x, Odd, Even)
        #PlotApproximation(f, A, coeffs)
        return A, coeffs
    def run_arcsin(eps, deg):
        def f(x):
            return math.asin(x)
        #eps = 1.e-7
        a = 0
        b = 0.5
        #deg = 4 # polynomial degree to use
        p = math.log(b,2) # point position
        A, coeffs = run_fun(f, a, b, deg, eps, True, False)
        return len(A)
    def run_exp(eps, deg):
        def f(x):
            return math.exp(-x)
        #eps = 1.e-7
        a = 0
        b = -math.log(eps)
        #deg = 4 # polynomial degree to use
        p = math.log(b,2) # point position
        A, coeffs = run_fun(f, a, b, deg, eps, False, False)
    return len(A)
    PlotApproximation(f, A, coeffs)
    print("Can do it using { }intervals:".format(len(A)))
    print(A)
    print("\nCoefficients:")
    print(coeffs)
        num = len(A) # number of intervals
        n = int(math.ceil(math.log(1./eps, 2.)) + p + 8)
        qubits = int((deg+1)*n + math.ceil(math.log(num,2.)))
        d = deg+1
        toffolis = int(math.ceil(1.5*n**2*d + 3*n*p*d + 3.5*n*d − 3*p**2*d
+3*p*d − d + 2*num*d*(4*math.ceil(math.log(num,2))−8) +4*num*n))
        print("\n\n***Estimates:***\nToffolis: { }\nQubits:
{ }".format(toffolis,qubits))
```

TABLE 3-continued

```
if __name__ == "__main__":
  #run_exp( )
  #exit( )
  def cols(num_at):
    return " &"*(6-num_at) + "\\\\"
    epsilons = [10.(−5), 10.(−7), 10.**(−9)]
  tex_epsilons = ['$10^{-5}$', '$10^{-7}$', '$10^{-9}$']
  degrees = [3, 4, 5, 6]
  print("Func\tEpsilon\tdeg\tnum_intervals")
  functions = [run_tanh, run_gaussian, run_sin, run_exp, run_arcsin]
  functionname = ['$\\tanh(x)$', '$\\exp(-x^2)$', '$\\sin(x)$', '$\\exp(-x)$','$\\arcsin(x)$']
  pointpositions = [8, 7, 3, 0, 0]
  for i in range(len(functions)):
    print("{ }{ }".format(functionname[i], cols(1)))
    fun = functions[i]
    for e in range(len(epsilons)):
      eps = epsilons[e]
      if i <= 2:
        p = pointpositions[i]
      elif i == 3:
        p = math.log(-math.log(eps), 2)
      elif i == 4:
        assert functionname[i] == '$\\arcsin(x)$'
        p = 1
        print("& {}{}".format(tex_epsilons[e], cols(2)))
      for deg in degrees:
        num = fun(eps, deg)
        n = int(math.ceil(math.log(1./eps, 2.)) + p + 8)
        qubits = int((deg+1)*n + math.ceil(math.log(num,2.)))
        d = deg+1
        toffolis = int(math.ceil(1.5*n**2*d + 3*n*p*d + 3.5*n*d − 3*p**2*d + 3*p*d − d + 2*num*d*(4*math.ceil(math.log(num,2))−8) +4*num*n))
        print("& & { } & { } & { } & { }\\\\".format(deg, num, qubits, toffolis))
```

If yes, then step 560 may include constructing a quantum circuit for polynomial evaluation of each polynomial on each subinterval. After all of the subdomains and the corresponding polynomials have been determined, f(x) may be implemented using the parallel polynomial evaluation circuit shown in FIG. 2.

Next, step 570 may include generating an output, including a quantum circuit for evaluation of the function f.

While FIGS. 3-5 describe methods for polynomial interpolation of certain quantum algorithms or functions, there are other functions that may require implementation using a Newton iteration. As an example, functions such as inverse square root may be better evaluated using a method like the Newton-Raphson method. In addition, for certain functions the evaluation may be better performed using the polynomial interpolation described with respect to FIG. 3 for certain intervals; but for other intervals the evaluation may be better performed using the Newton-Raphson method.

Figure 6:
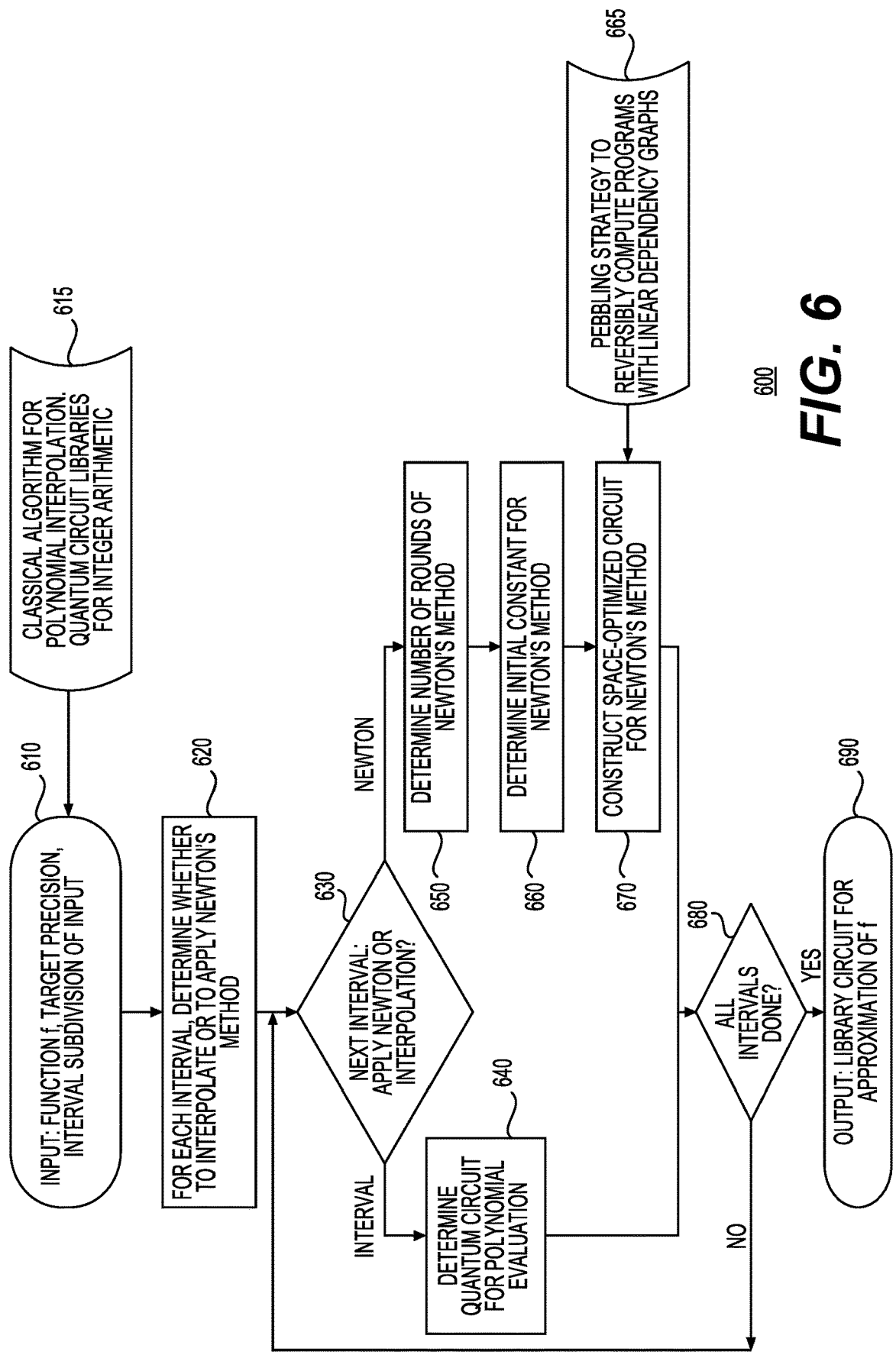
FIG. 6 shows a flow chart of another method for performing an evaluation of a polynomial corresponding to an input in accordance with one example.

FIG. 6 shows a flow chart or implementing evaluation of a polynomial on a quantum computer based on given intervals, using polynomial interpolation or Newton's method depending upon the interval. In step 610, an input, including a function f, target precision epsilon, and intervals subdividing the input may be received. A classical algorithm for polynomial interpolation as well as a quantum circuit library to implement basic arithmetic operations such as ADD and MUL can be provided in step 615.

In step 620, for each interval, a system (e.g., quantum computing system 710 of FIG. 7) may determine whether to interpolate or apply Newton's method.

In step 630, the system may evaluate whether with respect to the next interval, interpolation or Newton's method should be used. In the case of interpolation, as part of step 640, a quantum circuit for the polynomial evaluation may be determined. Any of the techniques described earlier may be used as part of this step.

In the case of application of the Newton-Raphson method, in step 650, the number of rounds of Newton's method may be determined. Next, in step 660, an initial constant for the Newton's method may be determined. Next, in step 670, a space-optimized circuit for the Newton's method may be constructed. This step may include access to an application of a pebbling strategy to reversibly compute programs with linear dependency graphs 665. In one example, as part of the Newton-Raphson method, the pebbling technique may be used to conserve space while using the parallel polynomial circuit shown in FIG. 1. The results of the multiply and add operations continue to accumulate over time and can use up a large amount of space. The pebbling technique may be implemented by selecting a suitable number of pebbles. As an example, in an instance where there are eight pebbles, 64 rounds of the Newton-Raphson method may be implemented and there will be an overhead of 369. Additional details for implementing the pebbling strategy as part of the parallel polynomial circuit use are described previously with respect to Table 1.

Once all of the intervals are completed, as determined in step 680, the output, including the circuit for approximation of function f, may be provided.

Figure 7:
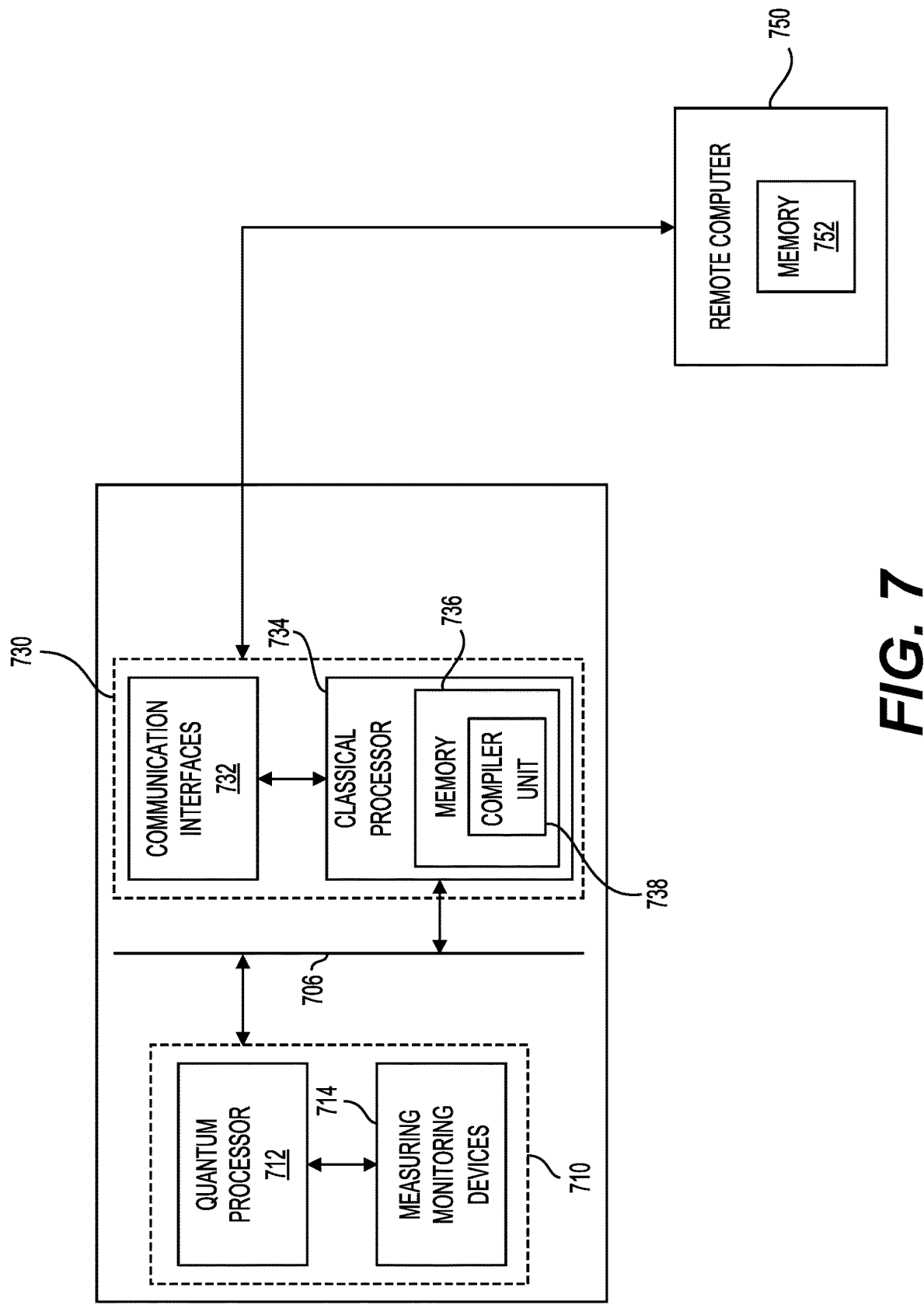
FIG. 7 shows an example system environment for implementing the methods described in the present disclosure.

FIG. 7 shows an example system environment for implementing aspects of the technology and the methods described in the present disclosure. System environment includes a quantum computing system 710 and a classical computing system 730, which is coupled to a remote computer 750. Quantum computing system 710 consumes the quantum circuits generated using the classical computing system 730. Quantum computing system 710 may include a quantum processor 712 and measuring/monitoring devices 714. In one example, quantum processor 712 and measuring/monitoring devices 714 may be configured to operate in a cryogenic environment (e.g., between 4 Kelvin and 77 Kelvin) such that quantum processor 712 may perform superconducting operations. Quantum processor 712 may execute quantum circuits that are compiled by classical computing system 730. The compiled quantum circuits may be communicated to quantum processor 712 via bus 706.

With continued reference to FIG. 7, classical computing system 730 may include communication interface(s) 732, classical processor 734, and memory 736. Memory 736 may include a compiler unit 738 including libraries and other programs or code to compile a high-level description of a quantum algorithm into quantum circuits. Compiler unit 738 may further include programs or code to execute the steps described with respect to FIGS. 3-5. Thus, compiler unit 738 may include programs or code that when executed by classical processor 734 may perform the various methods described with respect to the present disclosure. In one example, the code shown in Tables 1, 2, and 3 may be stored in memory 736 either as part of compiler unit 738 or separately. The high-level description of the quantum algorithm may be stored in memory 736 or in memory 752, which is associated with remote computer 750.

For quantum chemistry or machine learning applications, non-smooth functions are also required. As an example, the inverse square root can be used in both examples, namely for the calculation of the Coulomb potential and to determine the reciprocal when employing HHL for quantum machine learning.

In classical computing, inverse square roots appear in computer graphics and the term "fast inverse square root" is often used: it labels the procedure to approximate the inverse square root using bit-operations on the floating-point representation of the input. The code ultimately performs a Newton-Raphson iteration in order to improve upon a pretty accurate initial guess, which it finds using afore-mentioned bit-operations. Loosely speaking, the bit-operations consist of a bit-shift to divide the exponent by two in order to approximate the square root, followed by a subtraction of this result from a magic number, effectively negating the exponent and correcting the mantissa, which was also shifted together with the exponent. The magic number can be chosen using an auto-tuning procedure and varies depending on the objective function being used. This provides an extremely good initial guess for the Newton iteration at very low cost.

Figure 8:
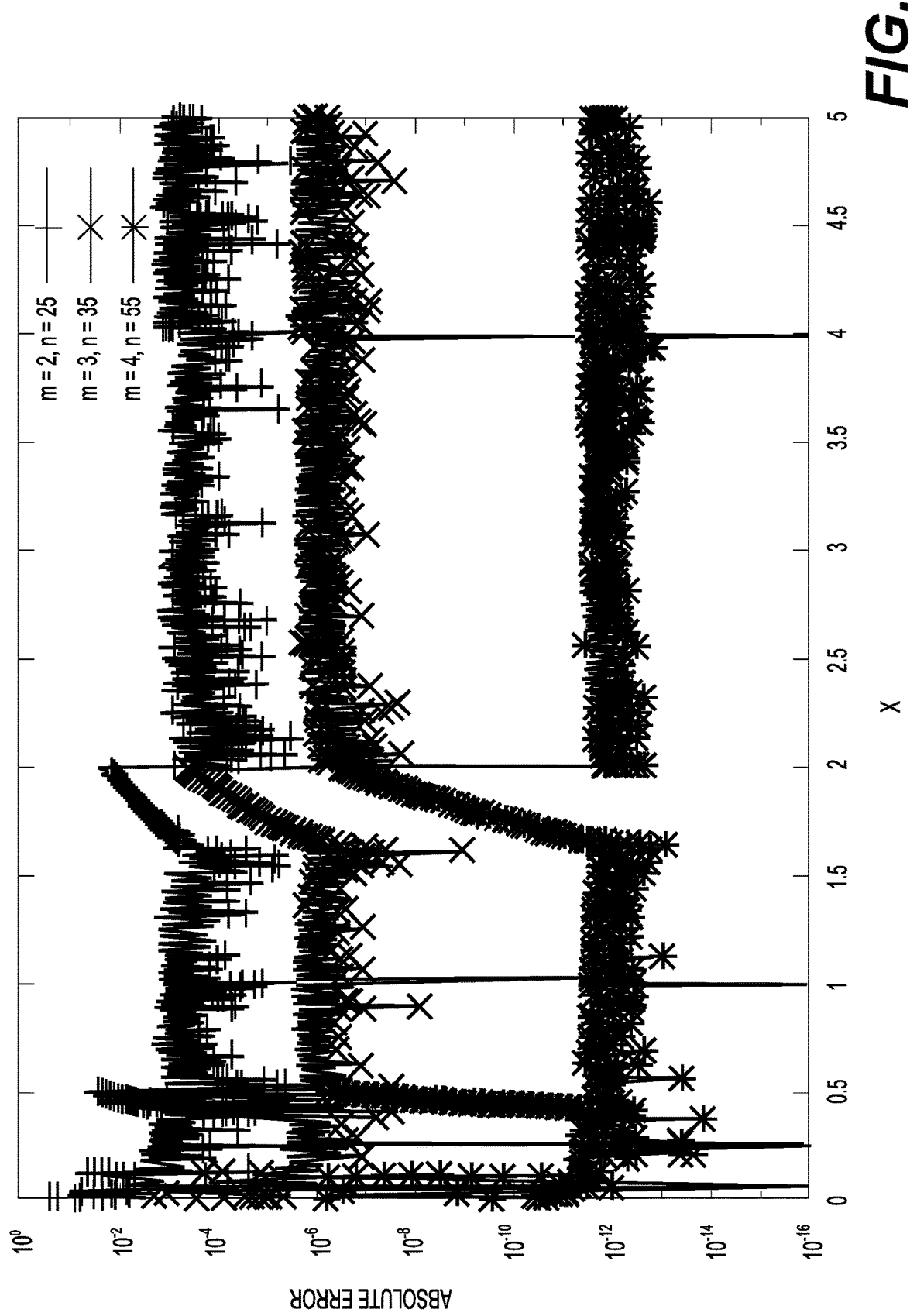
FIG. 8 shows absolute errors of an inverse square root function before tuning the constants in accordance with one example.
Figure 9:
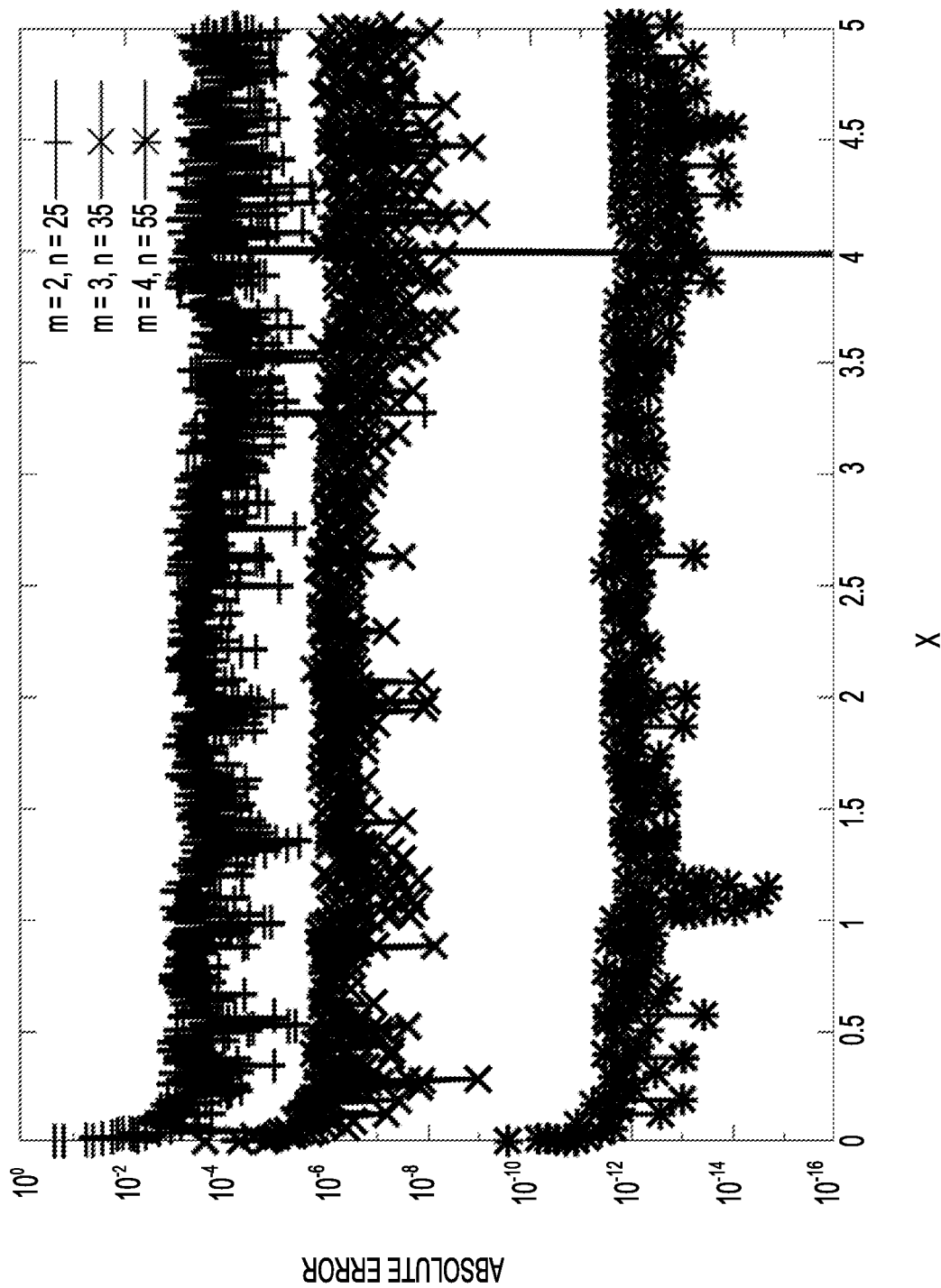
FIG. 9 shows absolute errors of an inverse square root function after tuning the constants in accordance with one example.

In an example implementation, a similar procedure is used to compute the inverse square root using fixed-point arithmetic. While the floating-point representation is not used, a low-cost initial guess is found, which allows for a small number of Newton iterations to be sufficient (i.e., 2-4 iterations). This includes determining the position of the first one in the bit-representation of the input, followed by an initialization which involves a case distinction on the magic number to use. The three constants were tuned such that the error peaks near powers of two in FIG. 8 vanish. The peaks appear due to the fact that the initial guess takes into account the location of the first one but completely ignores the actual magnitude of the input. For example, all inputs in [1,2) yield the same initial guess. The error plot with tuned constants is depicted in FIG. 9. The errors were evaluated for N=2000 (equidistant) points in the interval $$\left[\frac{1}{N}, 1\right]$$

using $m \in \{2,3,4\}$ Newton iterations and corresponding bit sizes $n \in \{25,35,54\}$. The fixed-point position is p=12, in order to ensure that no overflow occurs for small inputs. One can clearly observe that an entire Newton iteration can be saved when aiming for a given $L_\infty$-error.

Arcsine may be implemented as a combination of polynomial evaluation and (inverse) square root. Approximating the arcsine using only a polynomial allows for a good approximation in [0,0.5], but not near 1 (where it diverges). The Cephes math library may remedy this problem by adding a case distinction, employing a "double-angle identity" for x≥0.5. This may require computing the square root, which can be achieved by first calculating the inverse square root, followed by $$x \cdot \frac{1}{\sqrt{x}} = \sqrt{x}.$$

Figure 10:
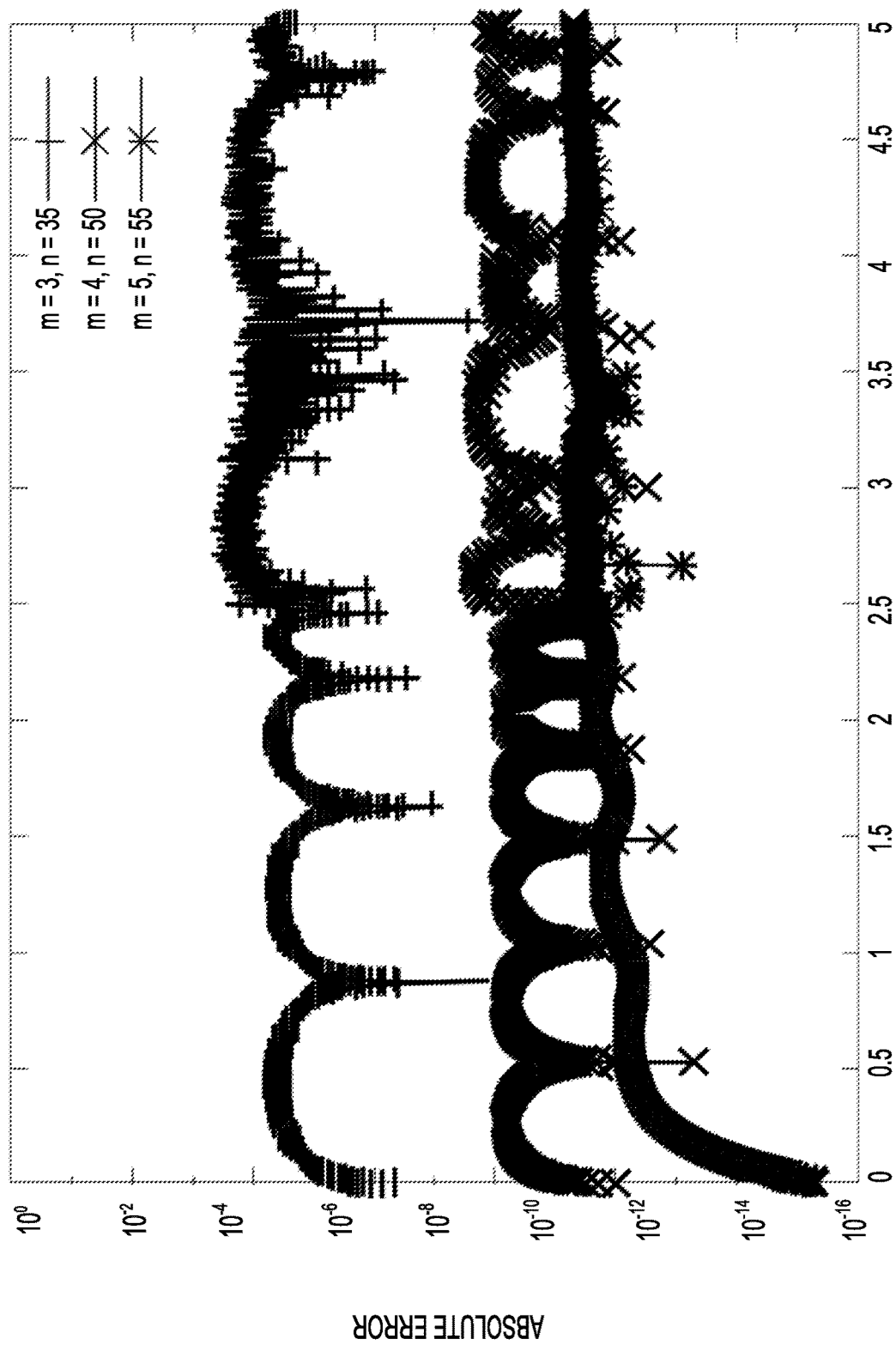
FIG. 10 shows absolute errors of a reversible implementation of the arcsine function in accordance with one example.

A resulting error plot from the implementation of the arcsine function is shown in FIG. 10, which is on [0,1] for N=2000 points of the example reversible implementation of the arcsine using $m \in \{3,4,5\}$ Newton iterations for calculating the inverse square root. The fixed-point position is chosen to be p=2 and total bit size n was chosen to be in $\{35,50,55\}$. The oscillations stem from the minimax polynomial which is used to approximate the arcsine on [0,0.5].

Note that certain applications may allow to a trade-off between the error in the arcsine with, e.g., probability of success by rescaling the input such that the arcsine needs to be computed only for values in [0,0.5]. This would allow one to remove the case-distinction and the subsequent calculation of the square root. As a result, one could evaluate the arcsine at a cost that is similar to the implementation costs of sin/cos. Estimates for the Toffoli and qubit counts for this case are shown in Table 4 below.

TABLE 4

| Function | $L_\infty$ error | Polynomial degree | Number of subintervals | Number of qubits | Number of Toffoli gates |
|---|---|---|---|---|---|
| arcsin(x) | | | | | |
| | $10^{-5}$ | | | | |
| | | 3 | 2 | 105 | 4872 |
| | | 4 | 2 | 131 | 6038 |
| | | 5 | 2 | 157 | 7204 |
| | | 6 | 2 | 183 | 8370 |
| | $10^{-7}$ | | | | |
| | | 3 | 3 | 134 | 7784 |
| | | 4 | 2 | 166 | 9419 |
| | | 5 | 2 | 199 | 11250 |
| | | 6 | 2 | 232 | 13081 |
| | $10^{-9}$ | | | | |
| | | 3 | 6 | 159 | 11264 |
| | | 4 | 3 | 197 | 13138 |
| | | 5 | 3 | 236 | 15672 |
| | | 6 | 2 | 274 | 17938 |

In fixed-point arithmetic, one represents numbers x using n bits as $$x = \underbrace{x_{n-1} \cdots x_{n-p}}_{p} \cdot \underbrace{x_{n-p-1} \cdots x_0}_{n-p},$$

where $x_i \in \{0,1\}$ is the i-th bit of the binary representation of x, and the point position p denotes the number of binary digits to the left of the binary point. We choose both the total number of bits n and the point position p to be constant over the course of a computation. As a consequence, over- and underflow errors are introduced, while keeping the required bit-size from growing with each operation.

Unless indicated otherwise, a fixed-point addition implementation is used, which keeps the bit-size constant. This amounts to allowing over- and underflow, while keeping the registers from growing with each operation. Multiplication can be performed by repeated-addition-and-shift, which can be seen from $$x \cdot y = x_{n-1} 2^{n-1} y + \ldots + x_0 2^0 y$$

where $x = \Sigma_i x_i 2^i$ with $x_i \in \{0,1\}$ denotes the binary expansion of the n-bit number x. Thus, for $i \in \{0, \ldots, n-1\}$, $2^{i-(n-p)} y$ is added to the result register (which is initially zero) if $x_i = 1$. This can be implemented using n controlled additions on 1, 2, ..., n bits if one allows for pre-truncation. Instead of computing the 2n-bit result and copying out the first n bits before uncomputing the multiplication again, the additions can be executed on a subset of the qubits, ignoring all bits beyond the scope of the n-bit result. Thus, each addition introduces an error of at most $$\varepsilon_A = \frac{1}{2^{n-p}}.$$

Since there are (at most) n such additions, the total error is $$\varepsilon = \frac{n}{2^{n-p}},$$

a factor n larger than using the costly approach mentioned above.

Negative multipliers are dealt with by substituting the controlled addition by a controlled subtraction when conditioning on the most significant bit because it has negative weight $w_{MSB} = -2^{n-1}$ in two's-complement notation. The multiplicand is assumed to be positive throughout, which removes the need for conditional inversions of input and output (for every multiplication), thus tremendously reducing the size of circuits that require many multiplications such as, e.g., polynomial evaluation.

The square of a number can be calculated using the same approach as for multiplication. Yet, one can save (almost) an entire register by only copying out the bit being conditioned on prior to performing the controlled addition. Then the bit can be reset using another CNOT gate, followed by copying out the next bit and performing the next controlled addition. The gate counts are identical to performing $$|x\rangle |0\rangle |0\rangle \mapsto |x\rangle |x\rangle |0\rangle \mapsto |x\rangle |x\rangle |x^2\rangle \mapsto |x\rangle |x^2\rangle |0\rangle,$$

while allowing to save n−1 qubits.

Next, resource estimates for polynomial evaluation are described. The evaluation of a degree d polynomial requires an initial multiplication $a_d \cdot x$, an addition of $a_{d-1}$, followed by d−1 multiply-accumulate instructions. The total number of Toffoli gates is thus equal to the cost of d multiply-accumulate instructions. Furthermore, d+1 registers are required for holding intermediate and final result(s) if no in-place adder is used for the last iteration (and no non-trivial pebbling strategy is applied). Other strategies may be employed in order to reduce the number of ancilla registers, at the cost of a larger gate count, see Tables 5-8 for examples of resource estimates for a number of functions.

TABLE 5

| Function | $L_\infty$ | Polynomial degree | Number of subintervals | Number of qubits | Number of Toffoli gates |
|---|---|---|---|---|---|
| tanh(x) | | | | | |
| | $10^{-5}$ | | | | |
| | | 3 | 15 | 136 | 12428 |
| | | 4 | 9 | 169 | 13768 |
| | | 5 | 7 | 201 | 15492 |
| | | 6 | 5 | 234 | 17544 |
| | $10^{-7}$ | | | | |
| | | 3 | 50 | 166 | 27724 |
| | | 4 | 23 | 205 | 23095 |
| | | 5 | 14 | 244 | 23570 |
| | | 6 | 10 | 284 | 26037 |
| | $10^{-9}$ | | | | |
| | | 3 | 162 | 192 | 77992 |
| | | 4 | 59 | 236 | 41646 |
| | | 5 | 30 | 281 | 35460 |
| | | 6 | 19 | 327 | 36578 |

TABLE 6

| Function | $L_\infty$ error | Polynomial degree | Number of subintervals | Number of qubits | Number of Toffoli gates |
|---|---|---|---|---|---|
| esp(−x²) | | | | | |
| | $10^{-5}$ | | | | |
| | | 3 | 11 | 132 | 10884 |
| | | 4 | 7 | 163 | 12141 |
| | | 5 | 5 | 195 | 14038 |
| | | 6 | 4 | 226 | 15863 |
| | $10^{-7}$ | | | | |
| | | 3 | 32 | 161 | 20504 |
| | | 4 | 15 | 199 | 19090 |
| | | 5 | 10 | 238 | 21180 |
| | | 6 | 7 | 187 | 23254 |
| | $10^{-9}$ | | | | |
| | | 3 | 97 | 187 | 49032 |
| | | 4 | 36 | 231 | 32305 |
| | | 5 | 19 | 275 | 30234 |
| | | 6 | 12 | 319 | 31595 |

TABLE 7

| Function | $L_\infty$ error | Polynomial degree | Number of subintervals | Number of qubits | Number of Toffoli gates |
|---|---|---|---|---|---|
| sin(x) | | | | | |
| | $10^{-5}$ | | | | |
| | | 3 | 2 | 132 | 6188 |
| | | 4 | 2 | 141 | 7679 |
| | | 5 | 2 | 169 | 9170 |
| | | 6 | 2 | 197 | 10661 |
| | $10^{-7}$ | | | | |
| | | 3 | 3 | 142 | 9444 |
| | | 4 | 2 | 176 | 11480 |
| | | 5 | 2 | 211 | 13720 |
| | | 6 | 2 | 246 | 15960 |
| | $10^{-9}$ | | | | |
| | | 3 | 7 | 167 | 13432 |
| | | 4 | 3 | 207 | 15567 |
| | | 5 | 2 | 247 | 18322 |
| | | 6 | 2 | 288 | 21321 |

TABLE 8

| Function | $L_\infty$ error | Polynomial degree | Number of subintervals | Number of qubits | Number of Toffoli gates |
|---|---|---|---|---|---|
| exp(-x) | | | | | |
| | $10^{-5}$ | | | | |
| | | 3 | 11 | 116 | 8106 |
| | | 4 | 6 | 143 | 8625 |
| | | 5 | 5 | 171 | 10055 |
| | | 6 | 4 | 198 | 11245 |
| | $10^{-7}$ | | | | |
| | | 3 | 31 | 149 | 17304 |
| | | 4 | 15 | 184 | 15690 |
| | | 5 | 9 | 220 | 16956 |
| | | 6 | 7 | 255 | 18662 |
| | $10^{-9}$ | | | | |
| | | 3 | 97 | 175 | 45012 |
| | | 4 | 36 | 216 | 28302 |
| | | 5 | 19 | 257 | 25721 |
| | | 6 | 12 | 298 | 26452 |

Note that all multiplications can be carried out assuming x>0, i.e. x can be conditionally inverted prior to the polynomial evaluation (and the pseudo-sign bit is copied out). The sign is then absorbed into the coefficients. Before adding $a_i$ into the $y_{i-1}$x-register, it is inverted conditioned on the sign-bit of x being set if the coefficient corresponds to an odd power. This is done because it is cheaper to implement a fixed-point multiplier, which can only deal with $y_{i-1}$ being negative.

The Toffoli gate count of multiplying two n-bit numbers is $$T_{mul}(n, p) = \sum_{i=0}^{p-1} Tcadd(n-i) + \sum_{i=1}^{n-p} Tcadd(n-i)$$

$$= \sum_{i=0}^{p-1} 3(n-i) + \sum_{i=1}^{n-p} 3(n-1) + 3n$$

$$= \frac{3}{2}n^2 + 3np + \frac{3}{2}n - 3p^2 + 3p$$

if one uses the controlled addition circuit by Takahashi et al., which requires 3n+3 Toffoli gates to (conditionally) add two n-bit numbers. The subsequent addition can be implemented using the addition circuit by Takahashi et al., featuring 2n−1 Toffoli gates. Thus, the total cost of a fused multiply-accumulate instruction is $T_{fma(n,p)} = 3/2n2 + 3np + 7/2n - 3p2 + 3p - 1.$ Therefore, the total Toffoli count for evaluating a degree d polynomial is $T_{poly(n,d,p)} = 3/2n2d + 3npd + 7/2nd - 3p2d + 3pd - d.$ Evaluating M polynomials in parallel for piecewise polynomial approximation requires only $$n + \lceil \log_2 M \rceil$$

additional qubits (since one n-qubit register is required to perform the addition in the last iteration, which is no longer just a constant) and $$2M\lceil \log_2 M \rceil$$

-controlled NOT gates, which can be performed in parallel with the multiplication. This increases the circuit size by $T_{extra}(M) = 2M(4\lceil \log_2 M \rceil - 8)$ Toffoli gates per multiply-accumulate instruction, since a k-controlled NOT can be achieved using 4(k−2) Toffoli gates and k−2 dirty ancilla qubits, which are readily available in this construction.

The label register l can be computed using 1 comparator per subinterval by:

$I_i = [a_i, a_{i_{i+1}}), a_0 < a_1 < \ldots < a_{M-1}.$

The comparator stores its output into one extra qubit, flipping it to 1 if $x \leq a_{i+1}$. The label register is then incremented from i−1 to i, conditioned on this output qubit still being 0 (indicating that $x > a_i$). Incrementing l can be achieved using CNOT gates applied to the qubits that correspond to ones in the bit-representation of (i−1)⊕i. Finally, the comparator output qubit is uncomputed again. This procedure is carried out M times for i=0, ..., M−1 and requires 1 additional qubit. The number of extra Toffoli gates for this label initialization is $T_{label}(M,n) = M \cdot 2T_{cmp}(n) = 4Mn,$ where, as a comparator, we use the CARRY-circuit, which needs 2n Toffoli gates to compare a classical value to a quantum register, and another 2n to uncompute the output and intermediate changes to the n required dirty ancilla qubits.

In total, the parallel polynomial evaluation circuit thus requires $$T_{pp}(n, d, p, M) = T_{poly}(n, d, p) + d \cdot T_{extra}(M)$$

$$+ T_{label}(M, n)$$

$$= \frac{3}{2}n^2 d + 3npd + \frac{7}{2}nd - 3p^2 d + 3pd - d$$

$$+ 3Md(4\lceil \log_2 M \rceil - 8) + 4Mn$$

Toffoli gates and $(d+1)n + \lceil \log_2 M \rceil + 1$ qubits.

The inverse square root, i.e., $$f(x) = \frac{1}{\sqrt{x}}$$

can be computed efficiently using Newton's method. The iteration looks as follows:

$$x_{n+1} = x_n \left(1.5 - \frac{ax_n^2}{2}\right),$$

where a is the input and $$x_n \xrightarrow{n \to \infty} \frac{1}{\sqrt{a}}$$

if the initial guess is sufficiently close to the true solution. In some examples, finding a good initial guess $$x_0 \approx \frac{1}{\sqrt{a}}$$

for Newton's zero-finding routine is useful for (fast) convergence. A crude approximation which turns out to be sufficient is the following:

$$\frac{1}{\sqrt{a}} = (2^{\log_2 a})^{-\frac{1}{2}} 2^{-\frac{\log_2 a}{2}} \approx 2^{\lfloor -\frac{\log_2 a}{2} \rfloor} = \tilde{x}_0,$$

where $$\lfloor \log_2 a \rfloor$$

can be determined by finding the first "1" when traversing the bit-representation of a from left to right (MSB to LSB). While the space requirement for $\tilde{x}_0$ is in $$O(\log_2 n),$$

such a representation would be impractical for the first Newton round. Furthermore, noting that the first iteration on $\tilde{x}=2^k$ leads to $$\tilde{x}_1 = 2^k \left(1.5 - \frac{a 2^{2k}}{2}\right) =: x_0, \quad (4)$$

one can directly choose this $x_0$ as the initial guess.

The preparation of $x_0$ can be achieved using $(n-1)+n+1$ ancilla qubits, which must be available due to the space requirements of the subsequent Newton steps. The one ancilla qubit is used as a flag indicating whether the first "1" from the left has already been encountered. For each iteration $i \in \{n-1, \ldots, 1, 0\}$, one determines whether the bit $a_i$ is 1 and stores this result $r_i$ in one of the n work qubits, conditioned on the flag being unset.

Then, conditioned on $r_i=1$, the flag is flipped, indicating that the first "1" has been found. If $r_i=1$, the $x_0$-register is initialized to the value in (4) as follows: using CNOTs, the $x_0$-register can be initialized to the value 1.5 shifted by $$k = \frac{p - 2i}{2},$$

where p denotes the binary point position of the input, followed by subtracting the $(3k-1)$-shifted input a from $x_0$, which may require up to n−1 ancilla qubits.

In order to improve the quality of the first guess for numbers close to $2^k$ for some $k \in \mathbb{Z}$, one can tune the constant 1.5 in ( ) i.e., turn it into a function C(k) of the exponent k. This increases the overall cost of calculating $x_0$ merely by a few CNOT gates but allows to save an entire Newton iteration even when only distinguishing three cases, namely $$C(k) := \begin{cases} 1.613, & k < 0 \\ 1.5, & k = 0 \\ 1.62, & k > 0 \end{cases} \quad (5)$$

The Newton iteration may include computing $x_{n+1}$ from $x_n$ by $$x_{n+1} = x_n \left(1.5 - \frac{a x_n^2}{2}\right),$$

which can be achieved as shown in Table 9 below:

TABLE 9

| | |
|---|---|
| 1. | Compute the square of $x_n$ into a new register. |
| 2. | Multiply $x_n^2$ by the shifted input to obtain $a x_n^2/2$. |
| 3. | Initialize another register to 1.5 and subtract $a x_n^2/2$. |
| 4. | Multiply the result by $x_n$ to arrive at $x_{n+1}$. |
| 5. | Uncompute the three intermediate results. |

Figure 11:
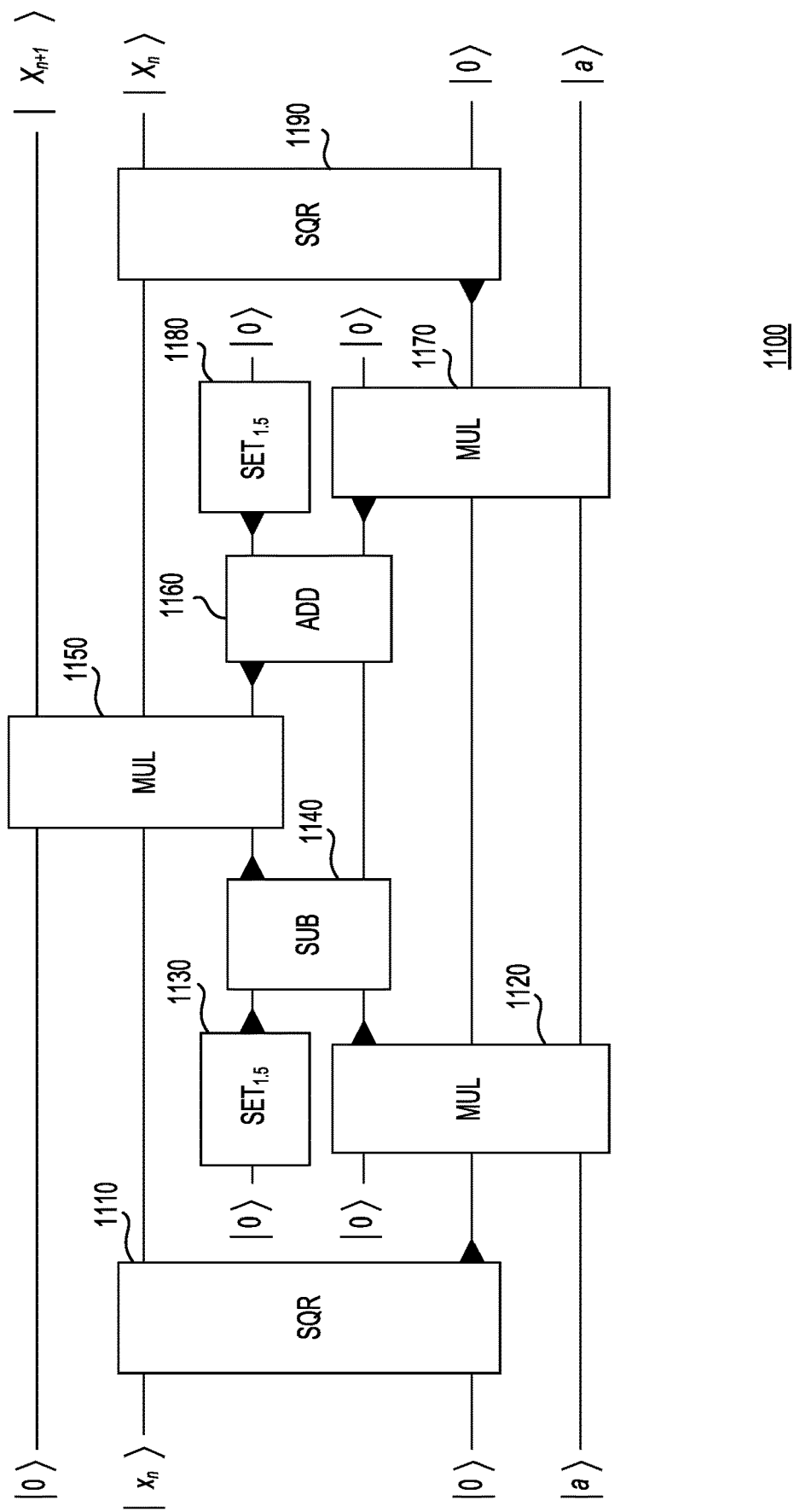
FIG. 11 shows a circuit for the n-th Newton iteration of computing of the inverse square root of a variable in accordance with one example.

The circuit of one such Newton iteration is depicted in FIG. 11. SQR 1110 computes the square of previous iterate $x_n$ into an empty result-register, which is then multiplied by the input a (MUL 1120), followed by subtracting (SUB 1140) this intermediate result from the value 1.5 initialized by block 1130. Finally, the next iterate, i.e., $$x_{n+1} = x_n \left(1.5 - \frac{a x_n^2}{2}\right)$$

can be computed by multiplying this intermediate result by $x_n$ using MUL 1150. All temporary results may then be cleared by running the appropriate operations in reversed order (using SQR 1190, MUL 1170, SET 1180, and ADD 1160).

Therefore, for m Newton iterations, this requires m+3 n-qubit registers if no pebbling is done on the Newton iterates, i.e., if all $x_i$ are kept in memory until the last Newton iteration has been completed.

Computing the initial guess for the fast inverse square root requires n controlled additions of two n-bit numbers plus 2n Toffoli gates for checking/setting the flag (and uncomputing it again). Thus, the Toffoli count for the initial guess is $$T_{init(n)} = n T_{cadd(n)} + 2n = 3n^2 + 5n.$$

Each Newton iteration features squaring, a multiplication, a subtraction, a final multiplication (yielding the next iterate), and then an uncomputation of the three intermediate results. In total, 5 multiplications and 2 additions are employed (of which 2 multiplications and 1 addition are run in reverse), which yields the Toffoli count $$T_{iter}(n, p) = 5 T_{mul}(n, p) + 2 T_{add}(n)$$

$$= \frac{15}{2} n^2 + 15np + \frac{23}{2} n - 15p^2 + 15p - 2.$$

The number of Toffoli gates for the entire Newton procedure (without un-computing the iterates) for m iterations thus reads $$T_{invsqrt}(n, m, p) = T_{init}(n) + m T_{iter}(n, p)$$

$$= n^2 \left(\frac{15}{2} m + 3\right) + 15npm + n\left(\frac{23}{2} m + 5\right) -$$

$$15 p^2 m + 15 pm - 2m.$$

Since each Newton iteration requires 3 ancilla registers (which are cleaned up after each round) to produce the next iterate, the total number of qubits is n(m+4), where one register holds the initial guess $x_0$.

Note that this is an upper bound on the required number of both qubits and Toffoli gates. Since Newton converges quadratically, there is no need to perform full additions and multiplications at each iteration. Rather, the number of bits n used for the fixed point representation should be an (increasing) function of the Newton iteration.

The square root can be calculated using $$\sqrt{x} = x \cdot \frac{1}{\sqrt{x}},$$

i.e., at a cost of an additional multiplication into a new register. Note that this new register would be required anyway when copying out the result and running the entire computation in reverse, in order to clear registers holding intermediate results. Thus, the total number of logical qubits remains unchanged.

While sin (x) and cos (x) may be easily approximated using, e.g., polynomials as described, their inverses are not. The main difficulty arises near ±1, where $$\frac{d\arcsin(x)}{dx} = \frac{1}{\sqrt{1-x^2}}$$

diverges.

Therefore, an alternative representation of arcsin (x) for larger values of x is used, e.g., $$\arcsin(x) = \frac{\pi}{2} - \arccos(x)$$
$$= \frac{\pi}{2} - \arcsin(\sqrt{1-x^2}).$$

Applying the double-argument identity to the last expression yields $$\arcsin(x) = \frac{\pi}{2} - 2\arcsin\left(\sqrt{\frac{1-x}{2}}\right), \quad (6)$$

a very useful identity which was already used in a classical math library called Cephes. The interval is again partitioned, using a minimax polynomial to approximate arcsin (x) for $x \in [0, 0.5)$, and the transformation in (6) for $x \in [0.5, 1]$.

The inverse square root implementation is used to compute $\sqrt{z}$ for $$z = \frac{1-x}{2},$$

which satisfies $z \in [0, 0.25]$, for $x \in [0.5, 1]$. Therefore, the fixed point position has to be chosen large, as the inverse square root diverges for small x. The multiplication by x after this computation takes care of the singularity and, since most bits of low-significance of $$\frac{1}{\sqrt{x}}$$

will cause underflow for small x, a shifted version of the inverse square root can be computed. This optimization reduces the number of extra bits required during the evaluation of the inverse square root.

In many applications, evaluating arcsin (x) only on the interval [0,0.5] may be sufficient. In such cases, the cost is much lower since this can be achieved using our parallel polynomial evaluation circuit. The Toffoli counts for this case are noted in Table 4.

In one example, the Arcsine is implemented as a combination of polynomial evaluation and the inverse square root to extend the polynomial approximation on [0,0.5] to the entire domain [0,1] employing the double-argument identity above.

First, the (pseudo) sign-bit of x is copied out and x is conditionally inverted (modulo two's-complement) to ensure x≥0. Since there are plenty of registers available, this can be achieved by conditionally initializing an extra register to 1 and then using a normal adder to increment $\bar{x}$ by one, where $\bar{x}$ denotes the bit- or one's-complement of x.

Since $x \in [0,1]$, one can determine whether x<0.5 using just one Toffoli gate (and 4 NOT gates). The result of this comparison is stored in an ancilla qubit denoted by a. $z = (1-x)/2$ can be computed using an adder (run in reverse) acting on x shifted by one and a new register, after having initialized it to 0.5 using a NOT gate.

Then, conditioned on $\bar{a}$ (i.e., on a being 0), this result is copied into the polynomial input register $p_{in}$ and, conditioned on a, x is squared into $p_{in}$. After having applied the polynomial evaluation circuit shown in FIG. 1 (which uncomputes intermediate results) to this input, $p_{in}$ can be uncomputed again, followed by computing the square root of z.

Then, the result of the polynomial evaluation is multiplied by either $\sqrt{z}$ or x, which can be achieved using 2n controlled swaps and one multiplier. The final transformation of the result consists of an initialization to π/2 followed by a subtraction, both conditioned on $\bar{a}$, and a copy conditioned on a. Finally, the initial conditional inversion of x can be undone after having (conditionally) inverted the output.

Following this procedure, the Toffoli count for this arcsine implementation on n-bit numbers using m Newton iterations for calculating $\sqrt{z}$ and a degree-d polynomial to approximate arcsin (x) on [0,0.5] can be written as $$T_{\arcsin} = 3T_{inv} + (2T_{poly} - T_{fma})$$
$$+ 2T_{csquare} + T_{mul} + T_{cadd}$$
$$+ (2T_{invsqrt} + T_{mul}) + 5n + 2$$
$$+ T_{add}$$
$$= 3T_{add} + 2T_{poly} + 3T_{mul}$$
$$+ T_{cadd} + 2T_{invsqrt} + 9n + 2$$
$$= d(3n^2 + n(6p+7) - 6(p-1)p - 2)$$
$$+ m(n(15n + 30p + 23) - 30p(p-1) - 4)$$
$$+ 9(n+1)p + \frac{9}{2}n(n+1)$$
$$+ 6n^2 + 28n - 9p^2 + 2$$

where $T_{inv(n)}$ denotes the Toffoli count for computing the two's-complement of an n-bit number and $T_{csquare(n,p)=T_{mul(n,p)+2n}}$ is the number of Toffoli gates required to perform a conditional squaring operation. Furthermore, 2n Toffoli gates are needed to achieve the conditional n-bit swap operation (twice), and another 3n are used for (conditional) copies.

All circuits were implemented at the gate level and tested using a reversible simulator extension to LIQUiD.

A summary of the required resource for implementing tan h (x), exp (−x²), and sin (x) can be found in Tables 5-8. For each function, one set of parameters was implemented reversibly at the level of Toffoli gates in order to verify the proposed circuits.

The convergence of the reversible fast inverse square root implementation with the number of Newton iterations are shown in FIG. 9, where the bit sizes and point positions have been chosen such that the roundoff errors do not interfere significantly with the convergence.

For all practical purposes, choosing between 3 and 5 Newton iterations should be sufficient. The effect of tuning the constants in the initial guess (see Eqn. 5) can be seen when comparing FIG. 8 to FIG. 9: The initial guess is obtained from the location of the first non-zero in the bit-representation of the input, which results in large rounding-effects for inputs close to an integer power of two.

Tuning the initial guess results in almost uniform convergence, which saves an entire Newton iteration for a given $L_\infty$-error.

The square root converges better than the inverse square root for small values, which can be expected, since $$\sqrt{x} = x \cdot \frac{1}{\sqrt{x}}$$

has a regularizing effect for small x. The error after m Newton iterations when using n bits for the fixed point representation is depicted in FIG. 5. Additionally, the initial guess could be improved by tuning the constants in Eqn. 4 such that the error is minimal after multiplying $$x \cdot \frac{1}{\sqrt{x}},$$

instead of just optimizing for the inverse square root itself.

Figure 12:
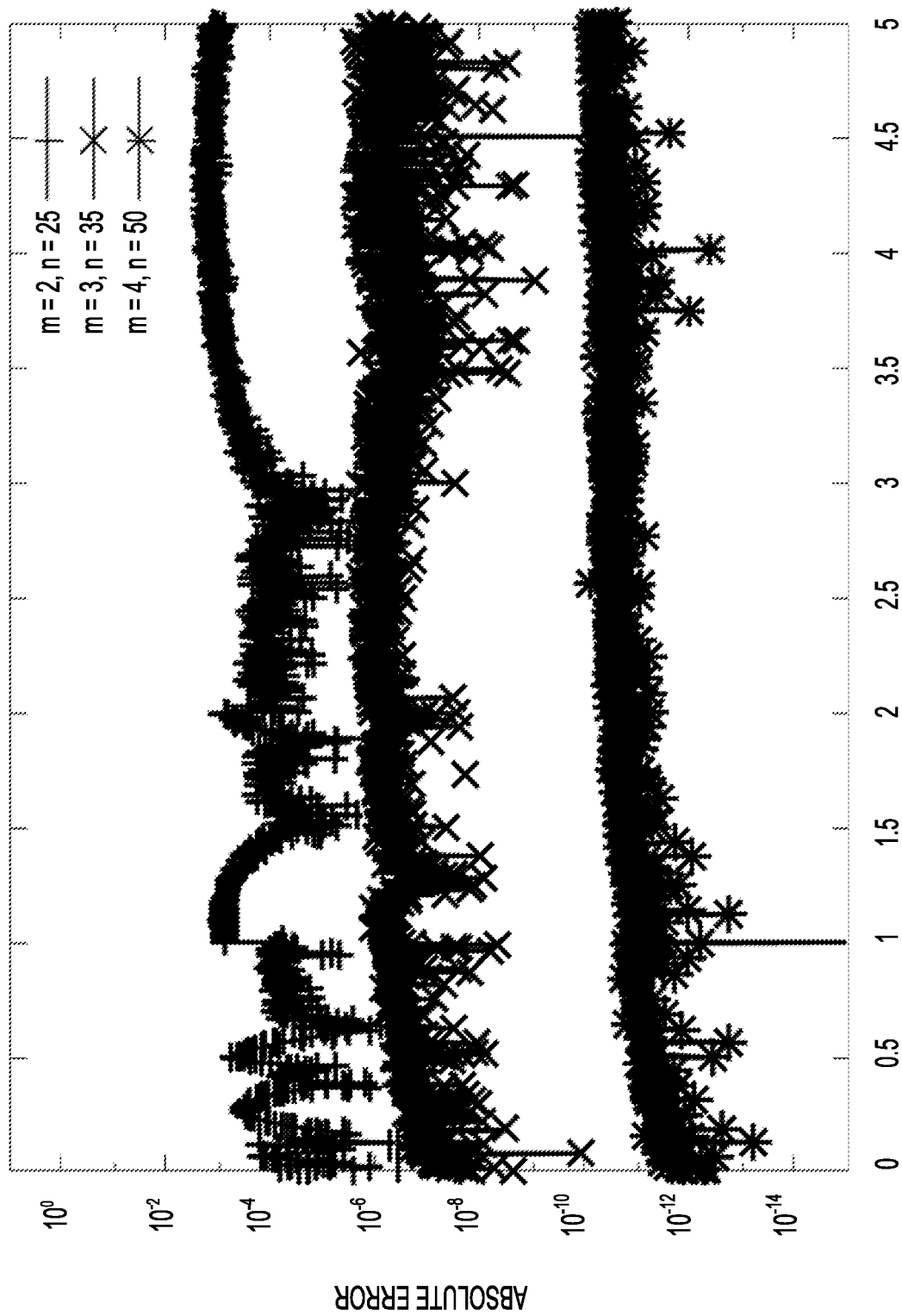
FIG. 12 shows absolute errors of a reversible implementation of the square root function for a certain number of Newton iterations in accordance with one example.

The example implementation of Arcsine uses both the polynomial evaluation and square root subroutines. The oscillatory behavior which can be seen in FIG. 8 is typical for minimax approximations. For x>0.5, the resolution is lower due to the wider range of $$\frac{1}{\sqrt{x}},$$

which was accounted for by calculating a shifted version of the inverse square root. FIG. 12 shows absolute error on [0,5] for N=2000 equidistant points of the example reversible implementation of the square root for m∈{2,3,4} Newton iterations and corresponding bit sizes n e {25,35,54}. The fixed-point position is chosen to be p=5.

While this saves a few qubits (to the left of the binary point), the reduced number of qubits to the right of the binary point fail to resolve the numbers as well, which manifests itself by bit-noise for x>0.5 in FIG. 3. The degrees of the minimax approximation were chosen to be 7, 13, and 17 for m=3,4,5, respectively. Since arcsin (x) is an odd function, this amounts to evaluating a degree 3, 6, and 8 polynomial in $x^2$, followed by a multiplication by x.

In conclusion, the present disclosure relates to a processor-implemented method for performing an evaluation of a polynomial corresponding to an input. The method may include determining a polynomial interpolation for a set of sub-intervals corresponding to the input. The method may further include constructing a quantum circuit for performing, in parallel, polynomial evaluation corresponding to each of the set of sub-intervals.

The method may further comprise determining an overall achievable precision for any input value that falls into any of the set of intervals. The method may further comprise partitioning the input into the set of sub-intervals by determining whether an input value falls into any of the set of sub-intervals and labeling the input value using a label indicative of one of the set of sub-intervals, where the sub-intervals may be chosen by pre-processing the input.

The polynomial evaluation may be performed in a nested fashion. The polynomial evaluation may be performed by applying a gate to load a next set of coefficients into a quantum register, while multiplying a previous set of coefficients by a variable to produce an output, and then adding the next set of coefficients to the output.

In another example, the present disclosure relates to a processor-implemented method for performing an evaluation of a polynomial corresponding to an input. The method may include determining a polynomial interpolation of an initial degree d for an initial set of sub-intervals corresponding to an input. The method may further include determining whether a required target precision is achievable based on the initial degree d and the set of sub-intervals. The method may further include if the target precision is achievable, then constructing a quantum circuit for performing, in parallel, polynomial evaluation corresponding to each of the set of sub-intervals. The method may further include if the target precision is not achievable, then either incrementing the initial degree d or subdividing the initial set of subintervals into additional intervals until the target precision is achievable and then constructing the quantum circuit.

The method may further include partitioning the input into the initial set of sub-intervals by determining whether an input value falls into any of the initial set of sub-intervals and labeling the input value using a label indicative of one of the initial set of sub-intervals. The initial set of sub-intervals may be chosen by pre-processing the input.

The polynomial evaluation may be performed in a nested fashion. The polynomial evaluation may be performed by applying a gate to load a next set of coefficients into a quantum register, while multiplying a previous set of coefficients by a variable to produce an output, and then adding the next set of coefficients to the output.

The input may be divided into the initial set of sub-intervals to reduce an approximation error associated with the polynomial evaluation. At least a subset of the initial set of intervals may be fused together to reduce a quantum cost associated with the polynomial evaluation.

In yet another example, the present disclosure relates to a processor-implemented method for performing an evaluation of a polynomial corresponding to an input. The method may include for each interval of a set of sub-intervals corresponding to the input, determining whether to perform the evaluation of the polynomial in a first mode or a second mode. The method may further include, in the first mode, performing the evaluation of the polynomial by: determining a polynomial interpolation of at most degree d for a first subset of the set of sub-intervals corresponding to the input, and constructing a quantum circuit for performing polynomial evaluation corresponding to each of the first subset of the set of sub-intervals. The method may further include, in the second mode, performing the evaluation of the polynomial using Newton's method for a second subset of the set of sub-intervals corresponding to the input, wherein the second subset is different from the first subset.

The method may further include determining an overall achievable precision for any input value that falls into any of the set of intervals. The method may further include partitioning the input into the set of sub-intervals by determining whether an input value falls into any of the set of sub-intervals and labeling the input value using a label indicative of one of the set of sub-intervals.

The polynomial evaluation may be performed by applying a gate to load a next set of coefficients into a quantum register, while multiplying a previous set of coefficients by a variable to produce an output, and then adding the next set of coefficient with the output. The iterations corresponding to the Newton's method may be implemented using a result of a pebbling strategy to meet a resource requirement corresponding to the quantum circuit. The resource requirement may be a number of available qubits corresponding to the quantum circuit. The resource requirement may be a circuit depth corresponding to the quantum circuit.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A processor-implemented method for compiling a quantum circuit for performing an evaluation of a polynomial, the method comprising:
   receiving an input comprising a polynomial function and a set of sub-intervals;
   partitioning the polynomial function into the set of sub-intervals by determining whether an input value of the polynomial function falls into any of the set of sub-intervals;
   computing a label register having at least one label indicative of at least one of the set of sub-intervals;
   determining a polynomial interpolation for the set of sub-intervals corresponding to the input; and
   using the processor generating an output including the quantum circuit to a quantum processor for execution,
   wherein the quantum circuit comprises a label gate for initializing the label register and quantum gates for performing, in parallel, polynomial evaluation corresponding to each of the set of sub-intervals.

2. The processor-implemented method of claim 1 further comprising determining an overall achievable precision for any input value that falls into any of the set of intervals.

3. The processor-implemented method of claim 1, wherein the set of sub-intervals is chosen by pre-processing the input.

4. The processor-implemented method of claim 1, wherein the polynomial evaluation is performed in a nested fashion.

5. The processor-implemented method of claim 1, wherein the polynomial evaluation is performed by applying a gate to load a next set of coefficients into a quantum register, while multiplying a previous set of coefficients by a variable to produce an output, and then adding the next set of coefficients to the output.

6. The processor-implemented method of claim 1, wherein the input is divided into the set of sub-intervals to reduce an approximation error associated with the polynomial evaluation.

7. The processor-implemented method of claim 6, wherein at least a subset of the set of intervals is fused together to reduce a quantum cost associated with the polynomial evaluation.

8. A processor-implemented method for compiling a quantum circuit for performing an evaluation of a polynomial corresponding to an input, the method comprising:
   receiving by the processor an input comprising a polynomial function and an initial set of sub-intervals;
   partitioning the polynomial function into the initial set of sub-intervals by determining whether an input value of the polynomial function falls into any of the initial set of sub-intervals;
   computing a label register having at least one label indicative of at least one of the initial set of sub-intervals;
   determining a polynomial interpolation of an initial degree d for the initial set of sub-intervals corresponding to the input;
   determining whether a required target precision is achievable based on the initial degree d and the initial set of sub-intervals;
   if the target precision is achievable, then generating an output including a quantum circuit to a quantum processor for execution; and
   if the target precision is not achievable, then either incrementing the initial degree d or subdividing the initial set of subintervals into additional intervals until the target precision is achievable and then generating the output including the quantum circuit to the quantum processor for execution,
   wherein the quantum circuit comprises a label gate for initializing the label register and quantum gates for performing, in parallel, polynomial evaluation corresponding to each of the set of sub-intervals.

9. The processor-implemented method of claim 8, wherein the initial set of sub-intervals is chosen by pre-processing the input.

10. The processor-implemented method of claim 8, wherein the polynomial evaluation is performed in a nested fashion.

11. The processor-implemented method of claim 8, wherein the polynomial evaluation is performed by applying a gate to load a next set of coefficients into a quantum register, while multiplying a previous set of coefficients by a variable to produce an output, and then adding the next set of coefficients to the output.

12. The processor-implemented method of claim 8, wherein the input is divided into the initial set of sub-intervals to reduce an approximation error associated with the polynomial evaluation.

13. The processor-implemented method of claim 8, wherein at least a subset of the initial set of intervals is fused together to reduce a quantum cost associated with the polynomial evaluation.

14. A processor-implemented method for performing an evaluation of a polynomial, the method comprising:
   receiving an input comprising a polynomial function and a set of sub-intervals;
   partitioning the polynomial function into the set of sub-intervals by determining whether an input value of the polynomial function falls into any of the set of sub-intervals;
   determining a polynomial interpolation for the set of sub-intervals corresponding to the input; and
   using the processor generating an output including a quantum circuit for performing, in parallel, polynomial evaluation corresponding to each of the set of sub-intervals, wherein the polynomial evaluation is performed by applying a gate to load a next set of coefficients into a quantum register, while multiplying a previous set of coefficients by a variable to produce an output, and then adding the next set of coefficients to the output.

15. The processor-implemented method of claim 14, further comprising determining an overall achievable precision for any input value that falls into any of the set of intervals.

16. The processor-implemented method of claim 14, wherein the set of sub-intervals is chosen by pre-processing the input.

17. The processor-implemented method of claim 14, wherein the polynomial evaluation is performed in a nested fashion.

18. The processor-implemented method of claim 14, further comprising labeling the input value using a label indicative of one of the set of sub-intervals.

19. The processor-implemented method of claim 14, wherein the previous set of coefficients are multiplied by a variable into a new register and the previous set of coefficients are stored as intermediate results.

20. The processor-implemented method of claim 14, wherein the input is divided into the set of sub-intervals to reduce an approximation error associated with the polynomial evaluation, and wherein at least a subset of the set of intervals is fused together to reduce a quantum cost associated with the polynomial evaluation.

* * * * *